(12) United States Patent
Weston et al.

(10) Patent No.: US 11,097,250 B2
(45) Date of Patent: Aug. 24, 2021

(54) METAL-ORGANIC FRAMEWORK PHASE AND CRYSTALLITE SHAPE CONTROL

(71) Applicants: The Regents of the University of California, Oakland, CA (US); ExxonMobil Research and Engineering Company, Annandale, NJ (US)

(72) Inventors: Simon C. Weston, Annandale, NJ (US); Jeffrey R. Long, Oakland, CA (US); Joseph M. Falkowski, Hampton, NJ (US); Kristen Colwell, Berkeley, CA (US); Rodolfo Torres, Berkeley, CA (US)

(73) Assignees: THE REGENTS OF THE UNIVERSITY OF CALIFORNIA, Oakland, CA (US); EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 44 days.

(21) Appl. No.: 16/582,860

(22) Filed: Sep. 25, 2019

(65) Prior Publication Data
US 2020/0101439 A1   Apr. 2, 2020

Related U.S. Application Data

(60) Provisional application No. 62/738,880, filed on Sep. 28, 2018.

(51) Int. Cl.
*B01J 20/22* (2006.01)
*B01J 20/30* (2006.01)
(Continued)

(52) U.S. Cl.
CPC ......... *B01J 20/226* (2013.01); *B01J 20/3085* (2013.01); *C07F 3/003* (2013.01);
(Continued)

(58) Field of Classification Search
CPC ....................................................... B01J 20/226
See application file for complete search history.

(56) References Cited

U.S. PATENT DOCUMENTS 10,322,398 B1 *  6/2019  Khazeni ............... B01J 20/3085
2010/0209354 A1 *  8/2010  Horcajada-Cortes ......................
                                                              C07F 15/025
                                                              424/9.6
(Continued)

FOREIGN PATENT DOCUMENTS

WO    WO 2013/059527 A1    4/2013

OTHER PUBLICATIONS

Lu et al. (Chem. Soc. Rev. 2014, 43, 5561) (Year: 2014).*
(Continued)

*Primary Examiner* — Liam J Heincer
(74) *Attorney, Agent, or Firm* — Morgan, Lewis & Bockius LLP; Brett A. Lovejoy

(57) ABSTRACT

Methods of synthesizing crystalline metal-organic frameworks (MOFs) comprising polytopic organic linkers and cations, where each linker is connected to two or more cations, are provided. In the disclosed methods, the linkers are reacted with a compound of formula $M_nX_m$, where M is cationic Be, Mg, Ca, Ti, V, Cr, Mn, Fe, Co, Ni, Cu, Zn, Zr, Nb, Mo, Ru, Rh, Pd, Cd, or Hf, X is anionic, n and m are integers. The reacting is buffered by a buffer devoid of metal coordinating functionality when the pKa of the anion is below a threshold related to the lowest pKa of the linker. The reacting is optionally not buffered when the pKa of the anion is at or above this threshold. The disclosed methods lead to product phase MOF in which crystal growth is controlled leading to control over molecular diffusion.

34 Claims, 33 Drawing Sheets

(51) Int. Cl.
| | |
|---|---|
| *C07F 3/00* | (2006.01) |
| *C07F 3/02* | (2006.01) |
| *C07F 3/06* | (2006.01) |
| *C07F 7/00* | (2006.01) |
| *C07F 7/28* | (2006.01) |
| *C07F 11/00* | (2006.01) |
| *C07F 15/00* | (2006.01) |
| *C07F 15/02* | (2006.01) |
| *C07F 15/04* | (2006.01) |
| *C07F 15/06* | (2006.01) |

(52) U.S. Cl.
CPC ............... *C07F 3/006* (2013.01); *C07F 3/02* (2013.01); *C07F 3/06* (2013.01); *C07F 7/003* (2013.01); *C07F 7/28* (2013.01); *C07F 11/005* (2013.01); *C07F 15/008* (2013.01); *C07F 15/0066* (2013.01); *C07F 15/025* (2013.01); *C07F 15/045* (2013.01); *C07F 15/065* (2013.01)

(56) References Cited

U.S. PATENT DOCUMENTS

| | | | | |
|---|---|---|---|---|
| 2011/0172412 | A1* | 7/2011 | Serre | C07C 7/13 540/145 |
| 2012/0247328 | A1* | 10/2012 | Brown | B01D 71/028 95/51 |
| 2014/0061540 | A1* | 3/2014 | Long | B01J 20/226 252/373 |
| 2015/0150981 | A1* | 6/2015 | Gref | A61K 47/24 514/777 |
| 2015/0173368 | A1* | 6/2015 | Morris | C07C 65/05 514/494 |
| 2015/0299226 | A1* | 10/2015 | Wei | C07F 3/06 548/101 |
| 2016/0159713 | A1* | 6/2016 | Long | B01J 20/226 556/147 |
| 2016/0176070 | A1* | 6/2016 | James | C07F 15/06 546/7 |
| 2016/0347774 | A1* | 12/2016 | Rubio Martinez | C07F 1/005 |
| 2017/0101429 | A1* | 4/2017 | Yaghi | F17C 11/00 |
| 2018/0104668 | A1* | 4/2018 | Tan | C07C 51/418 |
| 2018/0330709 | A1* | 11/2018 | McGrail | E04C 2/3405 |
| 2018/0333696 | A1* | 11/2018 | Burckhart | B01J 20/3007 |
| 2019/0031518 | A1* | 1/2019 | Johnson | B01J 29/40 |
| 2019/0039015 | A1* | 2/2019 | Long | B01D 53/047 |
| 2019/0054446 | A1* | 2/2019 | Long | B01J 20/28066 |
| 2019/0060867 | A1* | 2/2019 | Long | B01D 53/96 |
| 2019/0217271 | A1* | 7/2019 | Yamamoto | C08G 77/06 |
| 2020/0102337 | A1* | 4/2020 | Panchal | C07F 15/025 |

OTHER PUBLICATIONS

Ameloot et al. (Chem. Commun. 2010, 46, 3735-3737) (Year: 2010).*

Li et al. (Microchim Acta, 2017, 184, 3809-3815) (Year: 2017).*
International Search Report and Written Opinion for International Application No. PCT/US2019/052977 dated Jan. 28, 2020, 11 pages.
Kapelewski et al., "Metal-Organic Frameworks Exhibitint Increased Charge Density and Enhanced H2 Binding at the Open Metal Sites", Journal of the Americal Chemical Socitey, vol. 136, No. 34, Aug. 27, 2014, pp. 12119-12129.
Bachman, J., Smith, Z., Li, T. et al. Enhanced ethylene separation and plasticization resistance in polymer membranes incorporating metal-organic framework nanocrystals. Nature Mater 15, 845-849 (2016).
Caskey et al., 2008, J. Am. Chem. Soc. 130, p. 10870.
Cho et al., 2008, J. Am. Chem. Soc. 130, 16943.
Diring et al., 2010, Chem. Mater. 22, 4531.
ExxonMobil, "Outlook for Energy: A View to 2040," Feb. 2, 2018, on the Internet at https://corporate.exxonmobil.com/energy-and-environment/energy-resources/outlook-for-energy/2018-outlook-for-energy-a-view-to-2040#aViewTo2040, accessed Mar. 7, 2019.
Good et al., "Hydrogen Ion Buffers for Bifological Research", Feb. 1966, Biochem. 5(2), 467.
Hermes et al., 2007 J. Am. Chem. Soc. 129, 5324.
Kandegedara and Rorabacher, 1999, Anal. Chem. 71, 3140.
Lee et al., 2017, Cryst. Eng. Comm. 19, 426.
Lever and Ogden, 1967, Chem. Soc. (A) 2041.
Li et al., 2011, "Metal-Organic Frameworks for Separations," Chem. Rev. 112, 869.
McDonald et al., 2012, J. Am. Chem. Soc. 134, p. 7056.
McDonald et al., 2015, Nature 519, p. 303.
Milner, P. et al., "Overcoming double-step CO2 adsorption and minimizing water co-adsorption in bulky diamine-appended variants of Mg 2 (dobpdc)", Chemical Science, vol. 9, No. 1, Jan. 1, 2018, pp. 160-174.
Marchetti et al., 2007, Inorg. Chem. 2007, 46, 3378.
Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014.
Pachfule et al., 2016, Nature Chem. 8, 718.
Paul et al., 1970, J. Inorg. Nucl. Chem. 32, 3694.
Planas et al., 2013, "The Mechanism of Carbon Dioxide Adsorption in an Alkylamine-Functionalized Metal-organic Framework," J. Am. Chem. Soc. 135, pp. 7402-7405.
Quadrelli et al., 2007, "The energy-climate challenge: Recent trends in CO2 emissions from fuel combustion," Energy Policy 35, pp. 5938-5952.
Rosi et al., 2005, J. Am. Chem. Soc. 127(5), 1504.
Rowsell et al., 2006, Am. Chem. Soc. 128, p. 1304.
Siegelman, R. et al., "Controlling Cooperative CO2 Adsorption in Diamine-Appended Mg 2 (dobpdc) Metal-Organic Frameworks," Journal of the American Chemical Society, vol. 139, No. 30, Jul. 19, 2017, pp. 10526-10538.
Stock and Biswas, 2012, Chem. Rev. 112, 933.
Sumida et al., 2012, "Carbon Dioxide Capture in Metal-Organic Frameworks," Chem. Rev. 112, 724.
Vaccarelli et al., 2014, Energy Procedia 45, p. 1165.

\* cited by examiner

H$_4$dobdc

M$_2$(dobdc)

METAL-ORGANIC FRAMEWORK PHASE AND CRYSTALLITE SHAPE CONTROL

CROSS REFERENCE TO RELATED APPLICATION

The present application claims priority to U.S. Provisional Patent Application No. 62/738,880, entitled "Metal-Organic Framework Phase and Crystallite Shape Control," filed Sep. 28, 2018, which is hereby incorporated by reference.

FIELD OF THE PRESENT DISCLOSURE

The present application relates to the synthesis of metal-organic frameworks (MOFs) under conditions that affect the material phase and crystallite size and shape of such metal-organic frameworks thereby improving the adsorbent performance of such materials.

BACKGROUND

Porous materials have applicability as adsorbents and catalysts in a wide range of technologies such as chemical separations, energy storage, and catalysis. Potential industrial applications of a particular class of porous materials, metal-organic frameworks, include methane conversion, hydrocarbon separations and catalysis, noble gas separations, and carbon dioxide capture from flue gas. See, for example, Li et al., 2011, "Metal-Organic Frameworks for Separations," Chem. Rev. 112, 869; Sumida et al., 2012, "Carbon Dioxide Capture in Metal-Organic Frameworks," Chem. Rev. 112, 724; McDonald et al., 2015, "Cooperative Insertion of $CO_2$ in Diamine-Appended Metal-Organic Frameworks," Nature 519, 303; Milner et al., 2018, "Overcoming double-step $CO_2$ adsorption and minimizing water co-adsorption in bulky diamine-appended variants of $Mg_2$ (dobpdc)," Chem. Sci. 9, 160; and Bachman et al., 2016, "Enhanced ethylene separation and plasticization resistance in polymer membranes incorporating metal-organic framework nanocrystals," Nature Mater. 15, 845.

The processes involved in such chemical separations currently account for 10-15% of the world's energy usage. See, 2005, Oak Ridge National Laboratory. Materials for Separation Technologies: Energy and Emission Reduction Opportunities; and Humphrey and Keller, 1997, Separation Process Technology, McGraw-Hill. Separation performance, such as in packed-bed applications, can be highly dependent upon crystallite size and shape, which collectively control the surface area-to-volume ratio and mass transfer resistances of porous materials such as metal-organic frameworks. See Rousseau, 1987, "Handbook of Separation Process Technology," John Wiley and Sons, pp. 669-671. Catalytic performance of heterogeneous catalysts, such as metal-organic frameworks, can derive from factors including material phase and mass transfer resistances, the latter of which can be a function of crystallite size and shape. See Fogler, 2016, Elements of Chemical Reaction Engineering, Fifth Ed., Prentice Hall.

Carbon dioxide ($CO_2$) generated from burning fossil fuels at thermoelectric power plants is likely a major contributor to global climate change. See Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014. Addressing the increasing atmospheric levels of $CO_2$ requires new strategies for reducing $CO_2$ emissions from point sources such as natural gas-fired power plants, which are currently responsible for approximately 20% of global $CO_2$ emissions. See Quadrelli and Peterson, 2007, Energy Policy 35, p. 5938. This share will increase in the near future as economic factors favor a transition from coal to natural gas as a fossil fuel source. See ExxonMobil, "Outlook for Energy: A View to 2040," on the Internet at cdn.exxonmobil.com/~/media/global/files/outlook-for-energy/2018/2018-outlook-for-energy.pdf, accessed Sep. 26, 2018. The combustion of natural gas produces a 1 bar total pressure stream containing approximately 4-10% $CO_2$ at 40-60° C., with the remainder of the stream consisting of $H_2O$ (saturated), $O_2$ (4-12%), and $N_2$ (remainder). See Vaccarelli et al., 2014, Energy Procedia 45, p. 1165. Therefore, in the most challenging case removing ≥90% of the $CO_2$ from natural gas flue gas requires selective adsorption from a humid gas stream containing less than ≤0.4% (4 mbar) $CO_2$, which is a highly challenging separation. In addition, the adsorbent must possess long-term stability to both humidity and adsorption/desorption cycling for application in a temperature swing adsorption (TSA) process.

Adsorbents, such as $M_2$(dobdc) (M=Mg, Mn, Fe, Co, Ni, Zn, Cd; dobdc$^{4-}$=2,5-dioxido-1,4-benzenedicarboxylate, FIG. 1) and the associated expanded family of materials $M_2$(dobpdc) (M=Mg, Mn, Fe, Co, Ni, Zn; dobpdc$^{4-}$=4,4'-dioxidobiphenyl-3,3'-dicarboxylate, FIG. 2) (McDonald et al., 2015, Nature 519, p. 303; Siegelman, 2017, J. Am. Chem. Soc., 139, p. 10526) are of interest as porous solid adsorbent materials for use in separations, catalytic applications, and gas storage. Such metal-organic frameworks are of interest due to the structure featuring coordinatively-unsaturated metal sites along the pore. See Rosi et al., 2005, J. Am. Chem. Soc. 127(5), 1504; Rowsell et al., 2006, Am. Chem. Soc. 128, p. 1304; Caskey et al., 2008, J. Am. Chem. Soc. 130, p. 10870; McDonald et al., 2012, J. Am. Chem. Soc. 134, p. 7056; and Long et al., International Publication No. WO2013059527 A1, entitled "Alkylamine functionalized metal-organic frameworks for composite gas separations," dated Apr. 25, 2013.

One drawback with these materials is that conventional synthetic schemes typically result in crystalline metal-organic framework in which there is extended anisotropic growth, resulting in rod-like crystalline product. Metal-organic framework syntheses require a source of metal ions or clusters and a partially-to-fully deprotonated ligand. Generally, this is done at elevated temperature and in solution, with deprotonation occurring via formation of a base from solvent decomposition. The solvent is often a toxic and/or expensive solvent such as N,N-dimethylformamide.

Because macroscale crystalline characteristics of metal-organic frameworks, such as size and shape, have significant influence on adsorbent performance, such anisotropic crystal structures arising from conventional metal-organic framework schemes often preclude significant diffusion in the direction of the ab plane. Thus, most of the crystallite external surface for high aspect-ratio crystallites is expected to be inaccessible to gas diffusion.

As such, one goal in MOF synthesis is to establish the synthesis conditions that lead to crystalline metal-organic frameworks without decomposition of the organic linker. At the same time, the kinetics of crystallization should be appropriate to allow nucleation and growth of the desired phase to take place. These complex relationships make it difficult to determine synthetic reaction conditions for MOFs that will yield suitably sized and shaped MOF crystallites.

One strategy used in the literature to affect a specific size or shape of metal-organic framework crystallite is using additives with an established synthesis, referred to as coordination modulators. See Stock and Biswas, 2012, Chem. Rev. 112, 933; Hermes et al., 2007 J. Am. Chem. Soc. 129, 5324; Cho et al., 2008, J. Am. Chem. Soc. 130, 16943; Diring et al., 2010, Chem. Mater. 22, 4531; and Pachfule et al., 2016, Nature Chem. 8, 718. Most of these additives have the same or similar functional groups as the organic linker and are presumed to competitively bind during growth. However, all of these additives are also acids or bases, and can participate in pH equilibria during growth in addition to coordination equilibria. The only example of $M_2$(dobdc) control uses salicylic acid as a modulator but does not address its participation in acid/base equilibria. See Pachfule et al., 2016, Nature Chem. 8, 718. Other published syntheses of $M_2$(dobdc) or $M_2$(dobpdc) do not form monodisperse samples of crystallites, and they are of high aspect ratio or form polycrystalline masses. See Rosi et al., 2005, J. Am. Chem. Soc. 127(5), 1504, Rowsell and Yaghi, 2006, Am. Chem. Soc. 128, 1304; and Caskey et al., 2008, J. Am. Chem. Soc. 130, 10870.

Both solution pH and the addition of coordinating agents are known to influence the growth of metal-organic frameworks, and previous attempts to control crystallite size and shape have focused on them separately, with no attempt to control these variables independently.

Accordingly, what is needed in the art are improved metal-organic framework synthetic schemes that result in crystalline product with controlled crystallite dimensions.

SUMMARY

Disclosed herein are synthetic schemes for controlling the shape and aspect ratio of metal-organic frameworks (MOFs) through the judicious choice of non-coordinating anions and/or agents and through control of pH during the synthesis of such metal-organic frameworks. MOFs often have pore channels that run along crystallographic directions or a linear combination thereof forming crystals with anisotropic dimensions often with the pore along one of the longer crystallite dimensions which can affect molecular diffusion and subsequent adsorption and catalysis.

In some embodiments, the pH during metal-organic framework synthesis is controlled using non-coordinating agents or buffers. In some embodiments, coordinating functional groups and/or binding strength is altered through electronic substituent effects thereby allowing for precise, monodisperse control of crystallite length and shape for $M_2$(dobdc) and $M_2$(dobpdc). The use of these novel synthetic schemes to create low aspect ratio crystallites for these highly anisotropic metal-organic frameworks is demonstrated. Further demonstrated is how changing the surface functionality of the reaction vessel improves crystallite size and shape dispersity—demonstrated in different framework compositions—and can be used as a basis for selecting which phase of metal-organic framework forms from identical reaction mixtures. Benign materials such as plastic or steel may also improve crystallite size and shape dispersity. In some embodiments, functionalized surfaces direct crystallite size. Advantageously, some embodiments of the disclosed metal-organic framework synthetic schemes use economical, environmentally safe solvents.

One aspect of the present disclosure provides a method of synthesizing a crystalline metal-organic framework comprising a plurality of metal cations and a plurality of polytopic organic linkers. Each polytopic organic linker in the plurality of polytopic organic linkers is connected to two or more metal cations in the plurality of metal cations. The crystalline metal-organic framework is characterized by a pore channel with a c direction.

In the method, the plurality of polytopic organic linkers are reacted with a compound of formula $M_nX_m$, where M is cationic Be, Mg, Ca, Ti, V, Cr, Mn, Fe, Co, Ni, Cu, Zn, Zr, Nb, Mo, Ru, Rh, Pd, Cd, or Hf, X is a basic anion, n is a positive integer (e.g., 1 or greater) and m is a positive integer (e.g., 1 or greater). In some embodiments the reacting is in the presence of a buffer devoid of metal coordinating functionality when a pKa value of the basic anion is below a threshold, for example 3.5, and the reacting is optionally not in the presence of a buffer devoid of metal coordinating functionality when the pKa value of the basic anion is above a threshold, for example 3.5, thereby controlling an amount of crystal growth of the metal-organic framework (e.g., in one or more crystallographic directions or a linear combination thereof).

In some embodiments, each polytopic organic linker in the plurality of polytopic organic linkers has the formula:

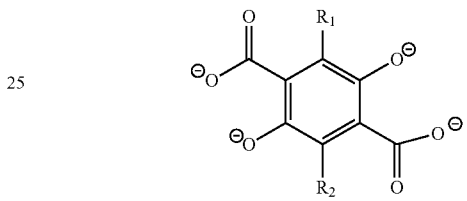

where $R_1$ and $R_2$ are each independently selected from H, halogen, hydroxyl, methyl, or halogen substituted methyl. In some embodiments, $R_1$ and $R_2$ are each hydrogen.

In some embodiments, each polytopic organic linker in the plurality of polytopic organic linkers has the formula:

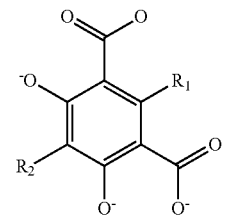

where $R_1$ and $R_2$ are each independently selected from H, halogen, hydroxyl, methyl, or halogen substituted methyl. In some embodiments, $R_1$ and $R_2$ are each hydrogen.

In some embodiments, each polytopic organic linker in the plurality of polytopic organic linkers has the formula:

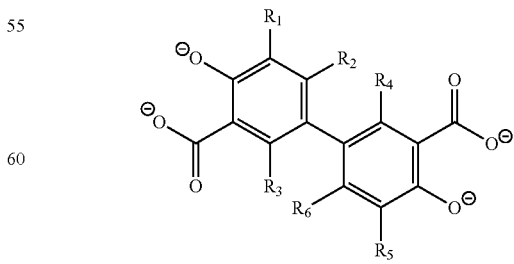

where $R_1$, $R_2$, $R_3$, $R_4$, $R_5$, and $R_6$ are each independently selected from H, halogen, hydroxyl, methyl, or halogen substituted methyl. In some embodiments, $R_1$, $R_2$, $R_3$, $R_4$, $R_5$, and $R_6$ are each hydrogen.

In some embodiments, each polytopic organic linker in the plurality of polytopic organic linkers has the formula:

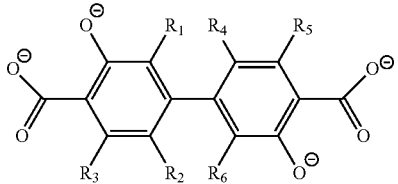

where $R_1$, $R_2$, $R_3$, $R_4$, $R_5$, and $R_6$ are each independently selected from H, halogen, hydroxyl, methyl, or halogen substituted methyl. In some embodiments, $R_1$, $R_2$, $R_3$, $R_4$, $R_5$, and $R_6$ are each hydrogen.

In some embodiments, each polytopic organic linker in the plurality of polytopic organic linkers is: 4,4'-dioxidobiphenyl-3,3'-dicarboxylate (dobpdc$^{4-}$), 4,4''-dioxido-[1,1',4', 1''-terphenyl]-3,3''-dicarboxylate (dotpdc$^{4-}$), dioxidobiphenyl-4,4'-dicarboxylate (para-carboxylate-dobpdc$^{4-}$ also referred to as pc-dobpdc$^{4-}$), 2,5-dioxidobenzene-1,4-dicarboxylate (dobdc$^{4-}$), 4,6-dioxido-1,3-benzenedicarboxylate (m-dobdc$^{4-}$), 1,3,5-benzenetristetrazolte (BTT), 1,3,5-benzenetristriazolate (BTTri), 1,3,5-benzenetrispyrazolate (BTP), or 1,3,5-benzenetriscarboxylate (BTC).

In some embodiments, each polytopic organic linker in the plurality of polytopic organic linkers is 2,5-dioxido-1, 4-benzenedicarboxylate (dobdc$^{4-}$).

In some embodiments, the compound of formula $M_nX_m$ is a magnesium(II) metal salt, a manganese(II) metal salt, an iron(II) metal salt, a cobalt (II) metal salt, a nickel(II) metal salt, a zinc(II) metal salt, or a cadmium(II) metal salt.

In some embodiments the compound of formula $M_nX_m$ is cobalt(II) nitrate, cobalt(II) chloride, cobalt(II) acetate, cobalt(II) sulfate, cobalt(II) iodide, cobalt(II) bromide, cobalt(II) trifluorosulfonate, cobalt(II) tetrafluoroborate, cobalt(II) acetylacetonate, cobalt(II) formate, cobalt(II) perchlorate or a halogenated derivative thereof.

In some embodiments, the basic anion is formate or acetate and the reacting is not in the presence of a buffer devoid of metal coordinating functionality.

In some embodiments, the basic anion is sulfate, bromide, iodide, perchlorate or trifluorosulfonate and the reacting is in the presence of a buffer devoid of metal coordinating functionality.

In some embodiments, the reacting is performed in unsilanized glassware using an oil bath.

In some embodiments, the reacting is performed in glassware that has been silanized with a silanizing agent. In some embodiments, the silanizing agent comprises chlorotrimethylsilane, trichlorohexylsilane, or a mixture thereof. In some embodiments, the reacting occurs in a 1:1 ethanol:$H_2O$ solvent. In some embodiments, the reacting occurs at a temperature greater than 60° C. for at least eight hours. In some embodiments, the reacting occurs at a temperature greater than 25° C. for at least five minutes.

In some embodiments, the reacting is in the presence of the buffer devoid of metal coordinating functionality, and the buffer devoid of metal coordinating functionality is PIPES (Piperazine-N,N'-bis(2-ethanesulfonic acid)), PIPPS (1,4-Piperazinedipropanesulfonic acid), PIPBS (1,4-Piperazinedibutanesulfonic acid), DEPP (Diethylpiperazine), DESPEN (1-Propanesulfonic acid, 3,3'-[1,2-ethanediylbis(ethylimino)]bis-(9CI)), IVIES (2-(N-morpholino)ethanesulfonic acid), TEEN (N,N,N',N'-Tetraethylethylenediamine), PIPES (Piperazine-N,Nrabis(2-ethanesulfonic acid)), MOBS (4-(N-Morpholino)butanesulfonic acid), or TEMN (N,N,N',N'-Tetraethylmethylenediamine).

In some embodiments, the reacting is in the presence of the buffer devoid of metal coordinating functionality, and the buffer devoid of metal coordinating functionality is an alkyl or alkylsulfonate derivative of morpholine, piperazine, ethylenediamine, or methylenediamine.

In some embodiments, the amount of crystal growth of the metal-organic framework (e.g., along one or more crystallographic directions or a linear combination thereof) is controlled so that the crystalline metal-organic framework is in the form of crystals having an average length to width aspect ratio of less than 5. In some embodiments, each polytopic organic linker in the plurality of polytopic organic linkers is connected to two metal cations in the plurality of metal cations.

DETAILED DESCRIPTION OF THE INVENTION

I. Introduction

Figure 1:
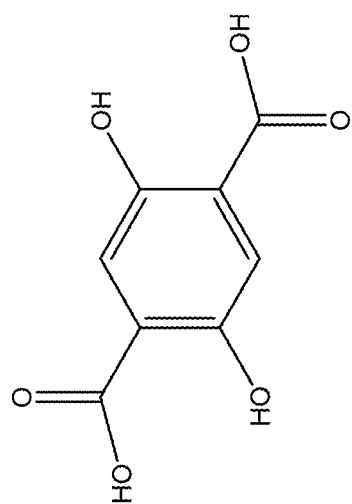
FIG. 1 illustrates the structure of a metal-organic framework $M_2$(dobdc), consisting of divalent metal cations and the ligand $H_4$dobdc, in accordance with the prior art.
Figure 1:
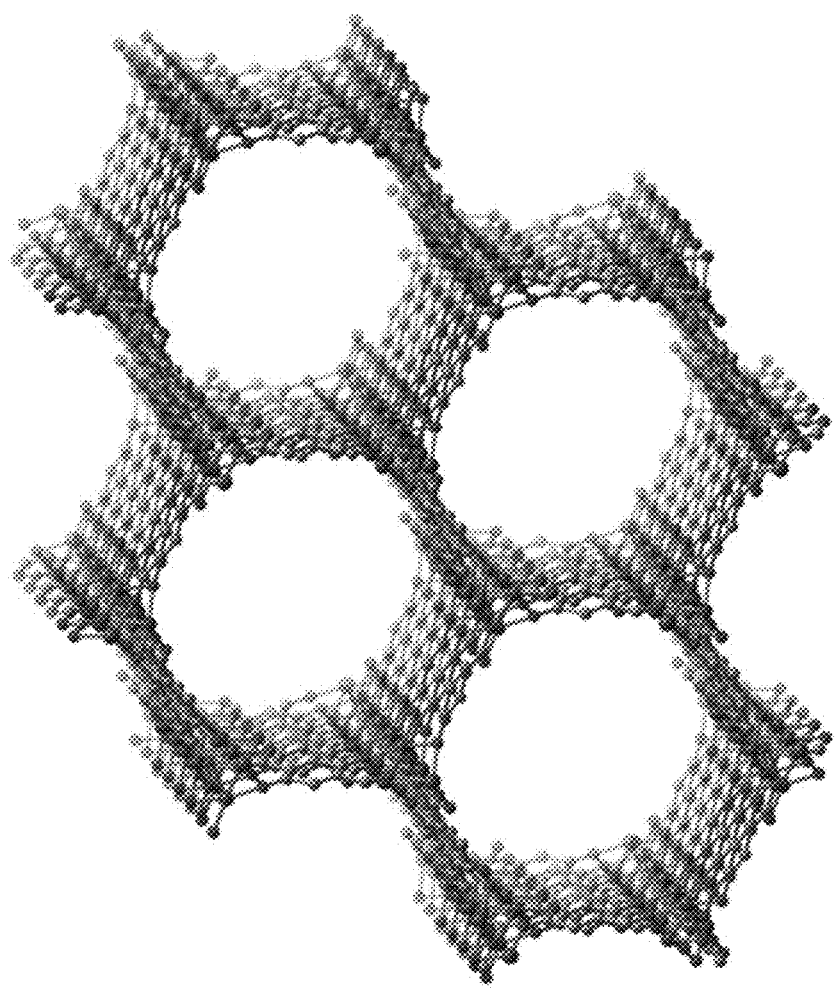
Figure 2:
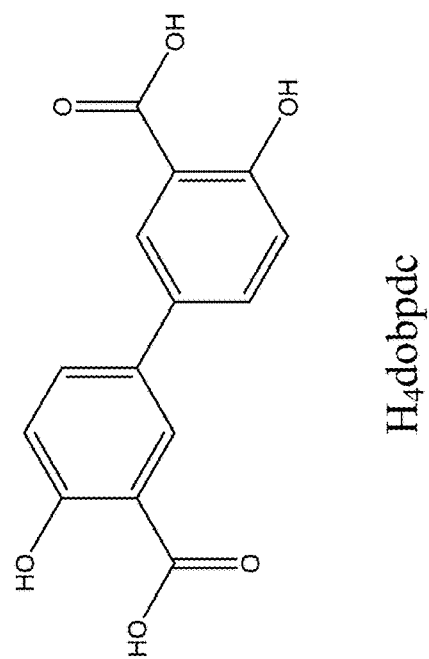
FIG. 2 illustrates the structure of a metal-organic framework $M_2$(dobpdc), consisting of divalent metal cations and the ligand $H_4$dobpdc, in accordance with the prior art.
Figure 2:
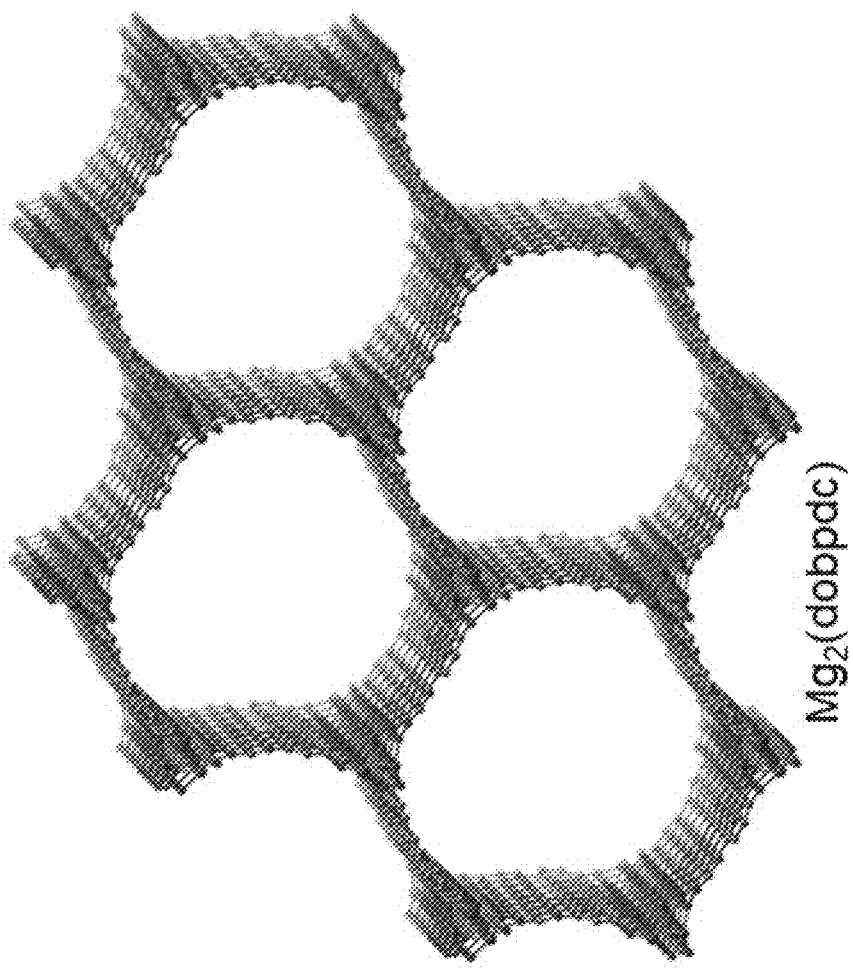
Figure 3:
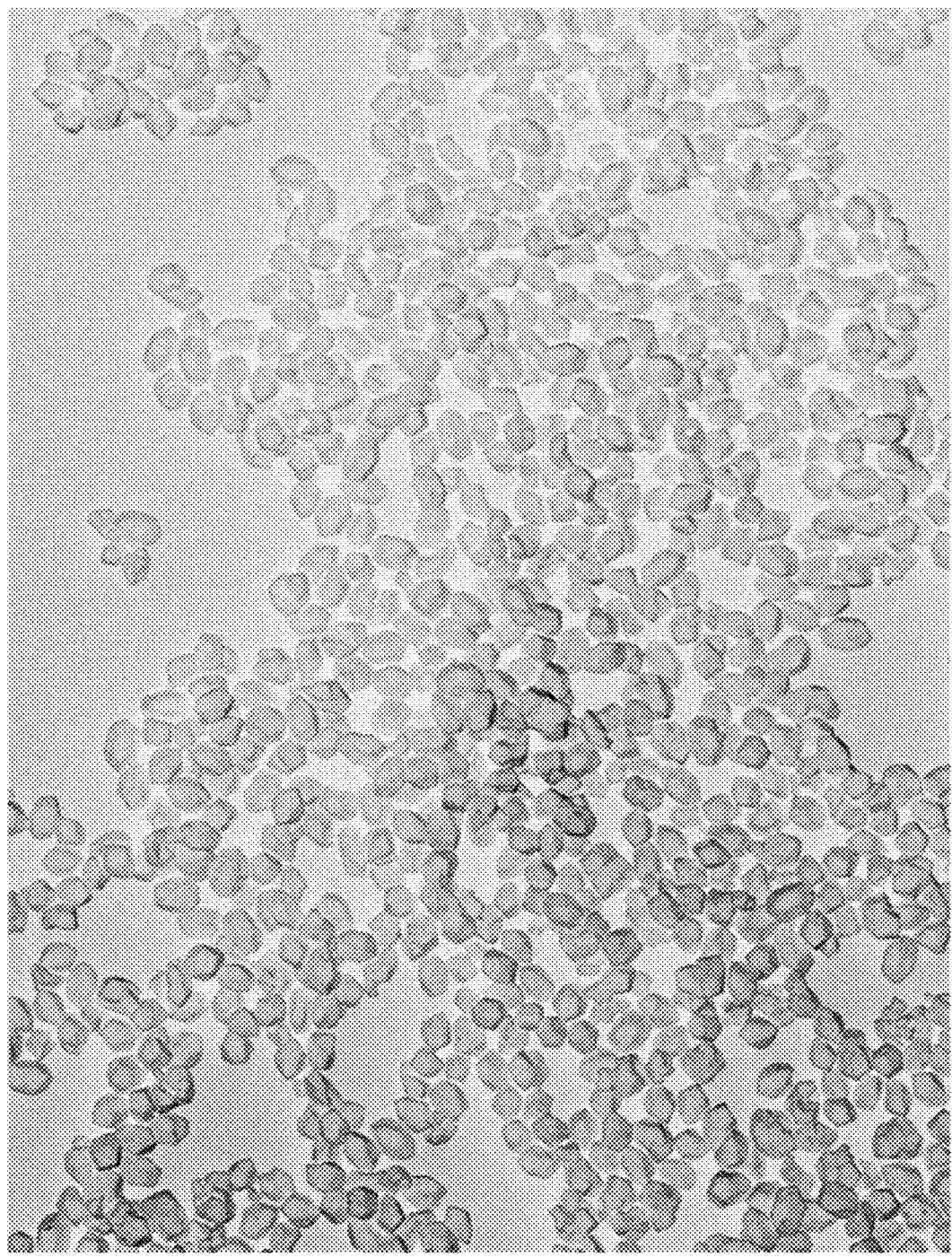
FIG. 3 illustrates an example image of $Co_2$(dobdc), at ×950 magnification, synthesized in the presence of the non-coordinating acid 3-(N-morpholino)propanesulfonic acid with cobalt(II) acetate, in accordance with an embodiment of a first reaction scheme of the present disclosure.
Figure 4A:
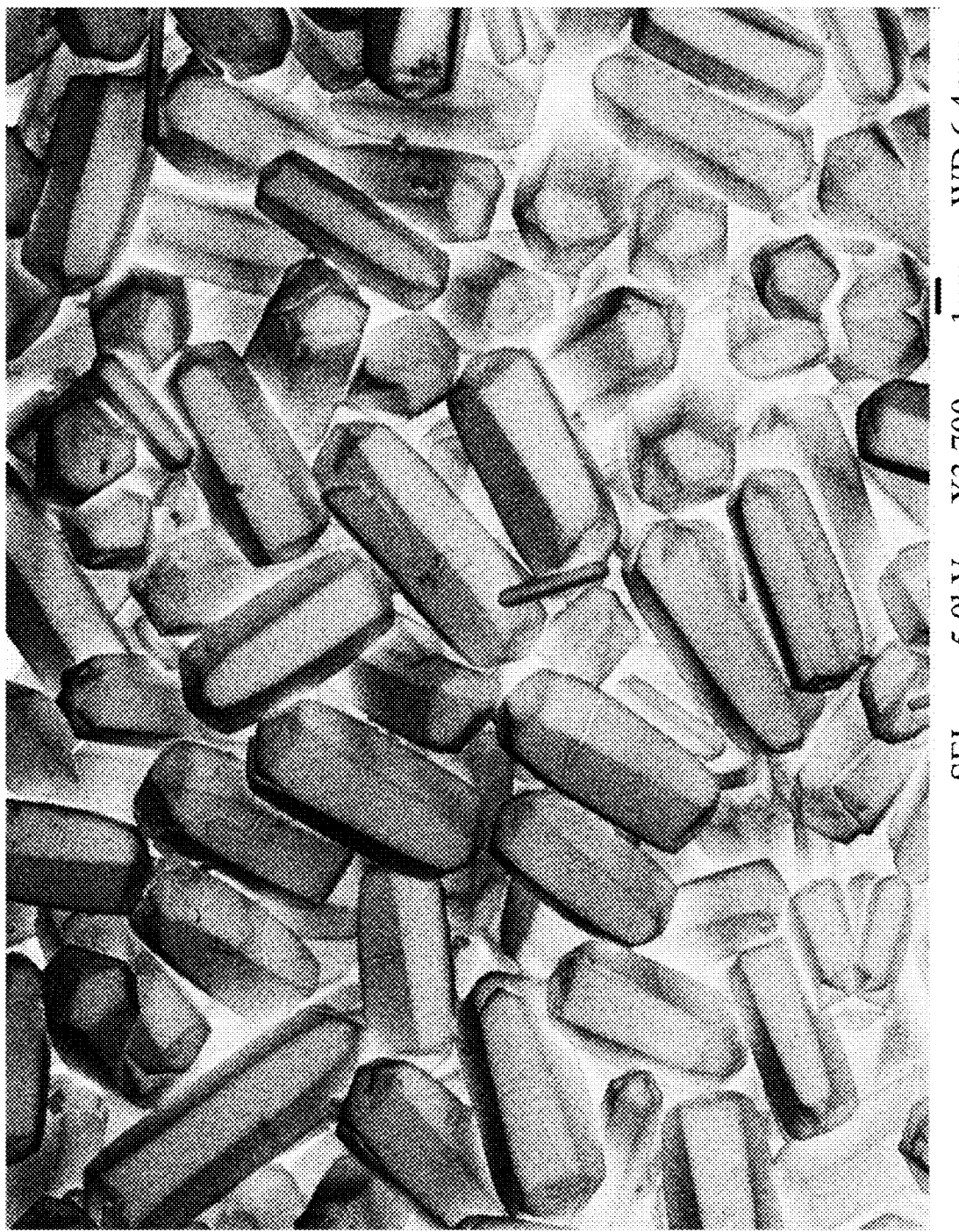
FIG. 4A illustrates an example image of $Co_2$(dobdc), at ×3700 magnification, synthesized in the presence of the non-coordinating acid 3-(N-morpholino)propanesulfonic acid with cobalt(II) trifluorosulfonate, in accordance with an embodiment of a first reaction scheme of the present disclosure.
Figure 4B:
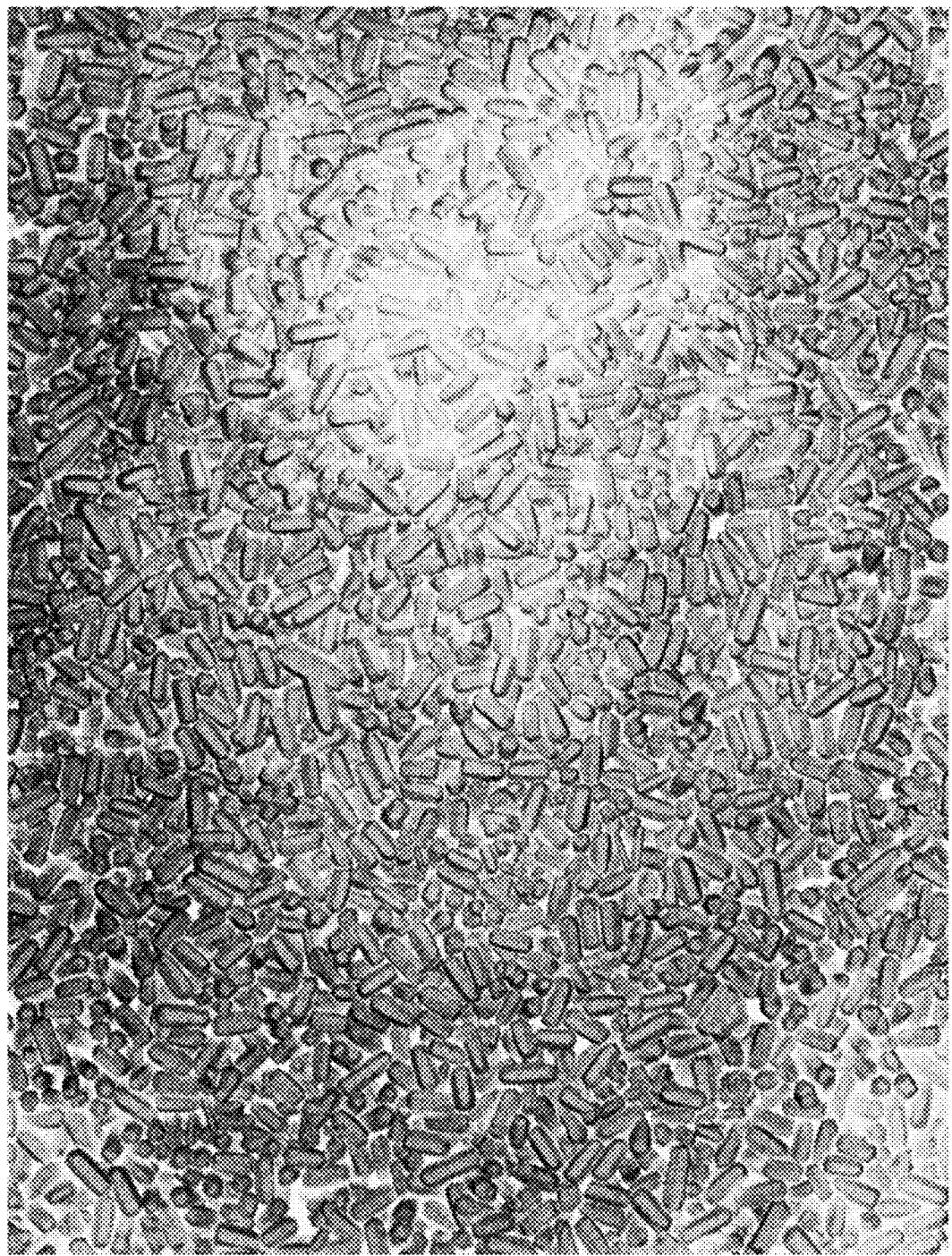
FIG. 4B illustrates another example image of $Co_2$(dobdc), at ×700 magnification, synthesized in the presence of the non-coordinating acid 3-(N-morpholino)propanesulfonic acid with cobalt(II) trifluorosulfonate, in accordance with an embodiment of a first reaction scheme of the present disclosure.
Figure 5A:
FIG. 5A illustrates an example image of $Co_2$(dobdc), at ×700 magnification, synthesized in the presence of the non-coordinating acid 3-(N-morpholino)propanesulfonic acid with cobalt(II) sulfate, in accordance with an embodiment of a first reaction scheme of the present disclosure.
Figure 5B:
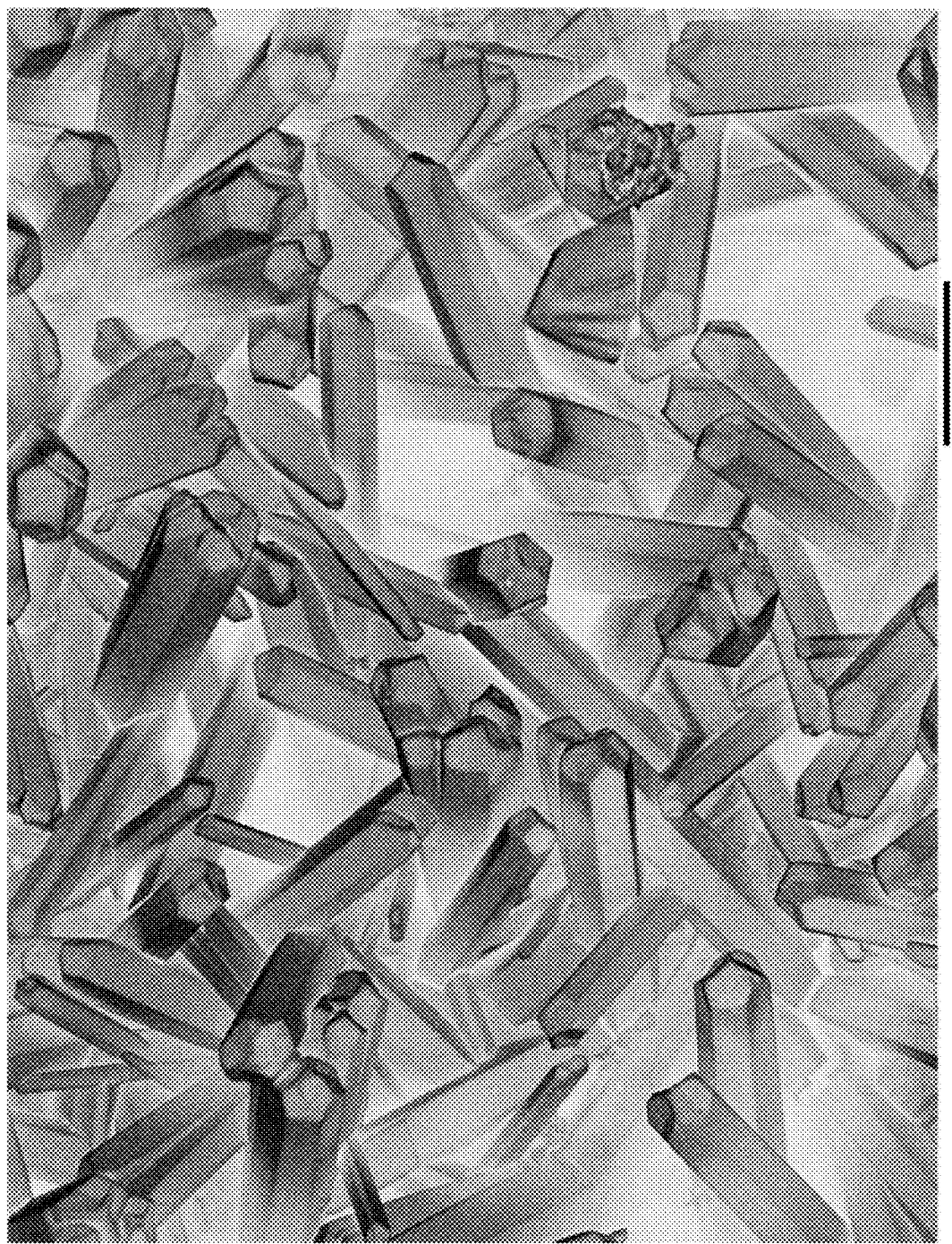
FIG. 5B illustrates another example image of $Co_2$(dobdc), at ×1600 magnification, synthesized in the presence of the non-coordinating acid 3-(N-morpholino)propanesulfonic acid with cobalt(II) sulfate, in accordance with an embodiment of a first reaction scheme of the present disclosure.
Figure 6A:
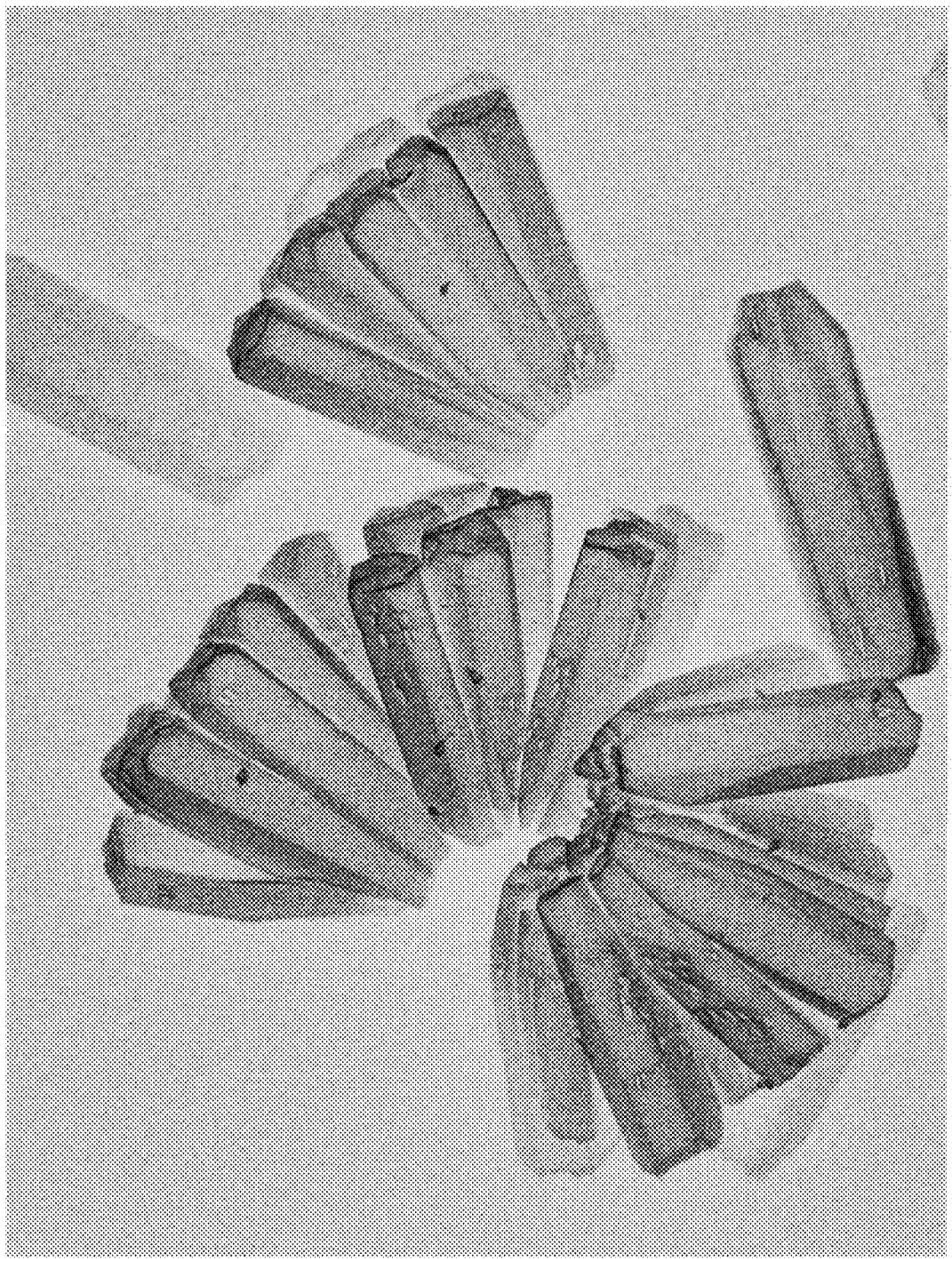
FIG. 6A illustrates an example image of $Co_2$(dobdc), at ×2300 magnification, synthesized in the presence of the non-coordinating acid 3-(N-morpholino)propanesulfonic acid with cobalt(II)iodide, in accordance with an embodiment of a first reaction scheme of the present disclosure.
Figure 6B:
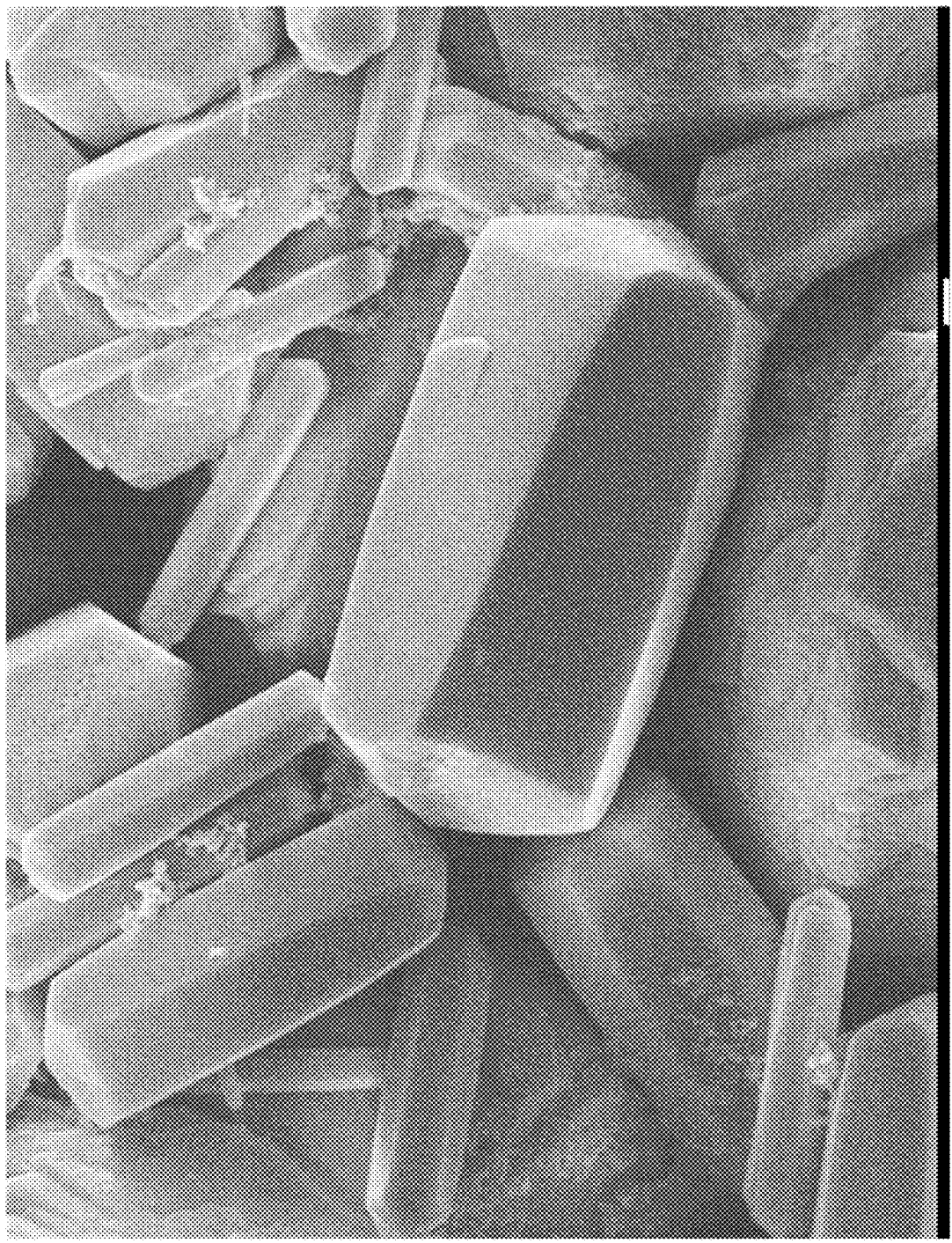
FIG. 6B illustrates an example image of $Co_2$(dobdc), at ×4500 magnification, synthesized in the presence of the non-coordinating acid 3-(N-morpholino)propanesulfonic acid with cobalt(II) bromide, in accordance with an embodiment of a first reaction scheme of the present disclosure.

The present disclosure provides for the synthesis of crystalline metal-organic frameworks (MOFs). These MOFs comprise polytopic organic linkers and metal cations, in which each polytopic organic linker is connected to two or more of the metal cations. In the disclosed methods, the linkers are reacted with a compound of formula $M_nX_m$, where M is cationic Be, Mg, Ca, Ti, V, Cr, Mn, Fe, Co, Ni, Cu, Zn, Zr, Nb, Mo, Ru, Rh, Pd, Cd, or Hf, X is a basic anion, and n is a positive integer (e.g., 1, 2, etc.) and m is a positive integer (e.g., 1, 2, etc.). In some embodiments, the reacting is in the presence of a buffer devoid of metal coordinating functionality (e.g., an alkyl or alkylsulfonate derivative of morpholine, piperazine, ethylenediamine, or methylenediamine) when the pKa of the basic anion is below the lowest pKa value of the linker. In some embodiments, the reacting is optionally not in the presence of this buffer when the pKa of the basic anion is above the lowest pKa value of the linker. In this way, an amount of crystal growth in at least one crystallographic direction or a linear combination thereof is controlled.

In some embodiments, the reacting is in the presence of a buffer devoid of metal coordinating functionality (e.g., an alkyl or alkylsulfonate derivative of morpholine, piperazine, ethylenediamine, or methylenediamine) when the pKa of the basic anion is below a threshold associated with (e.g. corresponding to, equal to) the lowest pKa value of the linker. In some embodiments, the reacting is optionally not in the presence of this buffer when the pKa of the basic anion is equal to or above this threshold.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —$CH_2O$— is intended to also optionally recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, cyclohexylmethyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl." Exemplary alkyl groups include the monounsaturated $C_{9-10}$, oleoyl chain or the diunsaturated $C_{9-10, 12-13}$ linoeyl chain.

The term "alkylene" by itself or as part of another substituent means a divalent radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl," and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R"', OC(O)R', —C(O)R', —CO$_2$R', —CONR'R", —OC(O)NR'R", —NR"C(O)R', NR'C(O)NR"R"', —NR"C(O)2R', —NR—C(NR'R"R"')=NR"", —NR—C(NR'R")=NR"', —S(O)R', —S(O)2R', —S(O)2NR'R", NRSO2R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, OR', =O, =NR', =N—OR', —NR'R", —SR', -halogen, —SiR'R"R''', OC(O)R', —C(O)R', $CO_2R'$, —CONR'R", —O C(O)NR'R", —NR"C(O)R', NR'C(O)NR"R''', —NR"C(O)2R', NR—C(NR'R"R''')=NR'''', NR C(NR'R")=NR''', —S(O)R', —S(O)2R', —S(O)2NR'R", NRSO2R', —CN and —$NO_2$, —R', —$N_3$, —CH(Ph)$_2$, fluoro($C_1$-$C_4$)alkoxy, and fluoro($C_1$-$C_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R''' and R'''' are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R'''' groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-($CH_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R''')$_d$—, where s and d are independently integers of from 0 to 3, and X is —O—, —NR'—, —S—, —S(O)—, —S(O)$_2$—, or —S(O)$_2$NR'—. The substituents R, R', R" and R''' are preferably independently selected from hydrogen or substituted or unsubstituted ($C_1$-$C_6$) alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

"—COOH" as this term is used is meant to optionally include —C(O)O$^-$ and —C(O)O$^-$ X$^+$, wherein X$^+$ is a cationic counter-ion. Likewise, a substituent having the formula —N(R)(R) is meant to optionally include —N$^+$H(R)(R) and —N$^+$H(R)(R)Y$^-$, where Y$^-$ represents an anionic counter-ion. Exemplary polymers of the invention include a protonated carboxylic moiety (COOH). Exemplary polymers of the invention include a deprotonated carboxylic moiety (COO$^-$). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition, it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides a crystalline material. The crystalline material comprises a metal-organic framework comprising a plurality of metal ions and a plurality of polytopic organic linkers. Each polytopic organic linker in the plurality of polytopic organic linkers is connected to at least two metal ions in the plurality of metal ions. In some embodiments, the adsorption material further comprises a plurality of ligands. In some such embodiments, each respective ligand in the plurality of ligands is appended to a metal ion in the plurality of metal ions of the metal-organic framework.

In some embodiments, the polytopic organic linker is 2,5-dioxido-1,4-benzenedicarboxylate (dobdc$^{4-}$), 4,6-dioxido-1,3-benzenedicarboxylate (m-dobdc$^{4-}$), 4,4'-dioxido-biphenyl-3,3'-dicarboxylate (dobpdc$^{4-}$), 4,4''-dioxido-[1,1':4',1''-terphenyl]-3,3''-dicarboxylate (dotpdc$^{4-}$), or dioxidobiphenyl-4,4'-dicarboxylate (para-carboxylate-dobpdc$^{4-}$ also referred to as pc-dobpdc$^{4-}$).

In some embodiments, each polytopic organic linker in the plurality of polytopic organic linkers has the formula:

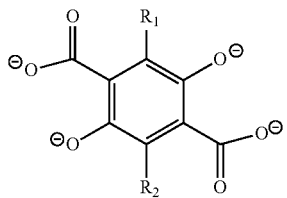

where $R_1$ and $R_2$ are each independently selected from H, halogen, hydroxyl, methyl, or halogen substituted methyl. In some embodiments, $R_1$ and $R_2$ are each hydrogen.

In some embodiments, each polytopic organic linker in the plurality of polytopic organic linkers has the formula:

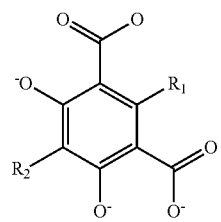

where $R_1$ and $R_2$ are each independently selected from H, halogen, hydroxyl, methyl, or halogen substituted methyl. In some embodiments, $R_1$ and $R_2$ are each hydrogen.

In some embodiments, each polytopic organic linker in the plurality of polytopic organic linkers has the formula:

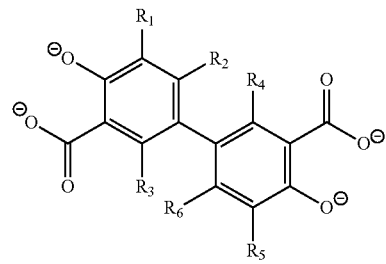

where $R_1$, $R_2$, $R_3$, $R_4$, $R_5$, and $R_6$ are each independently selected from H, halogen, hydroxyl, methyl, or halogen substituted methyl. In some embodiments, $R_1$, $R_2$, $R_3$, $R_4$, $R_5$, and $R_6$ are each hydrogen.

In some embodiments, each polytopic organic linker in the plurality of polytopic organic linkers has the formula:

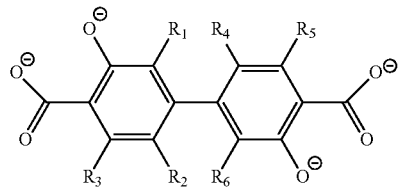

where $R_1$, $R_2$, $R_3$, $R_4$, $R_5$, and $R_6$ are each independently selected from H, halogen, hydroxyl, methyl, or halogen substituted methyl. In some embodiments, $R_1$, $R_2$, $R_3$, $R_4$, $R_5$, and $R_6$ are each hydrogen.

In some embodiments, the polytopic organic linker is 2,5-dioxido-1,4-benzenedicarboxylate (dobdc$^{4-}$), 4,6-dioxido-1,3-benzenedicarboxylate (m-dobdc$^{4-}$), 4,4'-dioxido-biphenyl-3,3'-dicarboxylate (dobpdc$^{4-}$), 4,4''-dioxido-[1,1':4',1''-terphenyl]-3,3''-dicarboxylate (dotpdc$^{4-}$), dioxidobiphenyl-4,4'-dicarboxylate (para-carboxylate-dobpdc$^{4-}$, also referred to as pc-dobpdc$^{4-}$), 2,5-dioxidobenzene-1,4-dicarboxylate (dobdc$^{4-}$), 1,3,5-benzenetristetrazolate (BTT), 1,3,5-benzenetristriazolate (BTTri), 1,3,5-benzenetrispyrazolate (BTP), or 1,3,5-benzenetriscarboxylate (BTC).

In some embodiments the compound of formula $M_nX_m$ is a magnesium(II) metal salt, a manganese(II) metal salt, an iron(II) metal salt, a cobalt (II) metal salt, a nickle(II) metal salt, a zinc(II) metal salt, or a cadmium(II) metal salt. In some embodiments, the metal salt is cobalt(II) nitrate, cobalt(II) chloride, cobalt(II) acetate, cobalt(II) sulfate, cobalt(II) iodide, cobalt(II) bromide, cobalt(II) trifluorosulfonate, cobalt(II) tetrafluoroborate, cobalt(II) acetylacetonate, cobalt(II) formate, cobalt(II) perchlorate or a halogenated derivative thereof. In some embodiments, the basic anion is formate or acetate. In some embodiments, the basic anion is sulfate, bromide, iodide, or triflurosulfonate and the reacting is in the presence of a buffer devoid of metal coordinating functionality.

IV. Exemplary Synthetic Schemes

In the present disclosure, crystalline metal-organic frameworks comprising a plurality of metal cations and a plurality of polytopic organic linkers are synthesized, where each polytopic organic linker in the plurality of polytopic organic linkers is connected to two or more metal cations in the plurality of metal cations, and the crystalline metal-organic framework is characterized by one or more pore channels. In some such embodiments, the plurality of polytopic organic linkers are reacted with a compound of formula $M_nX_m$, where M is cationic Be, Mg, Ca, Ti, V, Cr, Mn, Fe, Co, Ni, Cu, Zn, Zr, Nb, Mo, Ru, Rh, Pd, Cd, or Hf, X is a basic anion, and n is a positive integer (e.g., 1, 2, etc.) and m is a positive integer (e.g., 1, 2, etc.). In some embodiments n is 1 or 2 and m is 1 or 2. The reacting is in the presence of a buffer devoid of metal coordinating functionality when a pKa of the basic anion is below a threshold corresponding to the lowest pKa value of the linker (for example 3.5 in the case of linker with at least one pKa value below this threshold). The reacting is optionally not in the presence of this buffer when the pKa of the basic anion is above the threshold. In this way, an amount of crystal growth of the metal-organic framework (e.g., in one or more crystallographic directions or a linear combination thereof) is controlled. For example, in some embodiments crystal growth of the metal-organic framework in the c direction is controlled such that they are in the form of crystals having an average length to width aspect ratio of less than 5, less than 2, or less than 1.3.

The disclosed non-coordinating buffers form their genesis in the work of Good et al., 1966, Biochem. 5(2), 467, as further developed by Kandegedara and Rorabacher, 1999, Anal. Chem. 71, 3140, each of which is hereby incorporated by reference. However, such buffers have not been used before to control pH during metal-organic framework synthesis. In some embodiments, the buffer devoid of metal coordinating functionality is PIPES, PIPPS, PIPBS, DEPP, DESPEN, MES, TEEN, PIPES, MOBS, DESPEN, or TEMN. See Kandegedara and Rorabacher, 1999, Anal. Chem. 71, 3140. In some embodiments the buffer devoid of metal coordinating functionality is an alkyl or alkylsulfonate derivative of morpholine, piperazine, ethylenediamine, or methylenediamine.

There are reports of surface- or epitaxially-grown metal-organic frameworks. See Heinke et al., 2016, SURMOFs: Liquid-Phase Epitaxy of Metal-Organic Frameworks on Surfaces, in *The Chemistry of Metal-Organic Frameworks: Synthesis, Characterization, and Applications* (ed S. Kaskel), Wiley-VCH Verlag GmbH & Co. KGaA, Weinheim, Germany. doi: 10.1002/9783527693078, ch17, which is hereby incorporated by reference. In general, the synthetic procedure for surface- or epitaxially-grown metal-organic frameworks seeks to functionalize a surface and cause nucleation directly on the surface, generally with layer-by-layer growth. The strategy is normally contrasted with solvothermal or hydrothermal synthesis, whereby the products form at elevated temperature in solution. While the surface is of obvious concern in epitaxially-grown metal-organic frameworks, little attention has been paid to the role of surfaces in solvothermal and hydrothermal reactions. The process of silanization is a well-established technique to impart functionality or hydrophobicity to the surface of glassware. See Seed, 2001, "Silanizing Glassware", Current Protocols in Cell Biology 8:3E: A.3E.1-A.3E.2 and Plueddemann, 1991, "Chemistry of Silane Coupling Agents," In: Silane Coupling Agents, Springer, Boston, Mass., each of which is incorporated by reference. However, the effect of using different hydrophobic surfaces during solvothermal or hydrothermal syntheses of metal-organic frameworks has not been studied for phase selection or for morphological control.

Dramatically different methods of synthesis have been found to lead to different metal-organic framework morphologies. For example, microwave heating has been found to lead to different crystallite size than solvothermal growth. See Stock and Biswas, 2012, *Chem. Rev.* 112, 933, which is hereby incorporated by reference. However, within hydrothermal synthesis, the effect of oil bath heating versus oven heating has only been studied in limited conditions for the framework UiO-66 and In-MIL-68, and not at all for synthesis of the frameworks $M_2$(dobdc) or $M_2$(dobpdc). See Lee et al., 2017, Cryst. Eng. Comm. 19, 426, which is hereby incorporated by reference.

One aspect of the present disclosure provides for the synthesis of metal-organic frameworks in the presence of a non-coordinating buffer or non-coordinating base, with controlled heating and/or reaction vessel functionalization. The strategy of employing non-coordinating buffers, acids, or bases allows for controlled deprotonation of the ligand at a wide range of pH values without interfering with the coordination equilibria desired to effect a certain crystal morphology. Using these tools, the pH can be set independently from the solvent/ligand/counterion coordination during growth. Further, by controlling the pH without relying on solvent decomposition, precise control over what coordinating agents are available in solution is provided. Judicious choice of additive or metal counterion allows preferential coordination during growth to some crystal facets, slowing growth in that direction. While modulation has been known to affect particle size and stability, selective attachment to one end of the crystal structure is non-obvious. Use of a stronger coordinating agent selectively slows growth along the direction of the pore channel (FIG. 1).

Figure 15:
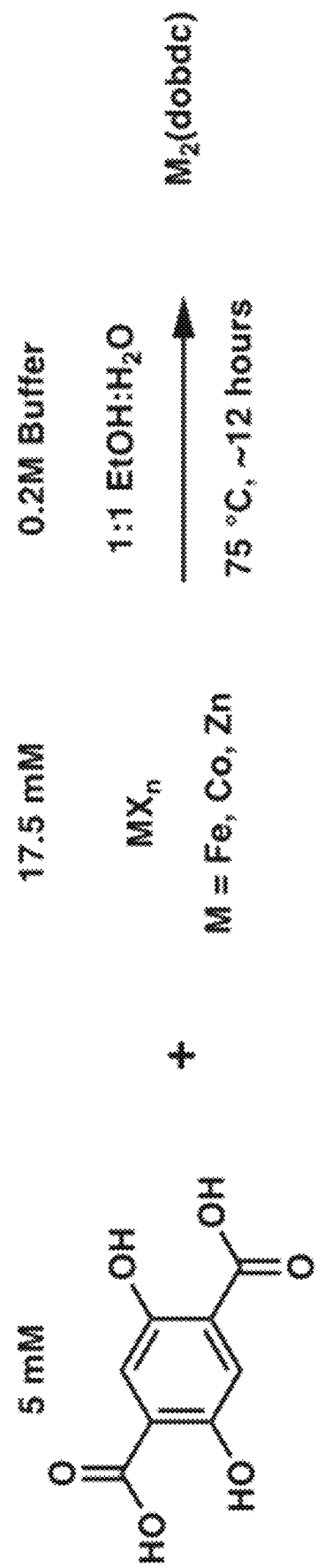
FIG. 15 illustrates an example of a first reaction scheme for the synthesis of a crystalline metal-organic framework, such as $M_2$(dobdc), with a buffer devoid of metal coordinating functionality (e.g., 3-(N-morpholino)propanesulfonic acid which has a room temperature $pK_a$ value of 7.09), in accordance with an embodiment of the present disclosure.

First reaction scheme. As an example, the coordination environment via variation of the cobalt(II) metal salt during $Co_2$(dobdc) synthesis has been controlled in accordance with a first reaction scheme, an example of which is provided in FIG. 15.

In the first reaction scheme, a crystalline metal-organic framework is formed that comprises a plurality of metal cations and a plurality of polytopic organic linkers, where each polytopic organic linker in the plurality of polytopic organic linkers is connected to two or more metal cations in the plurality of metal cations. The crystalline metal-organic framework is characterized by a pore channel with a c direction.

In the first reaction scheme, the plurality of polytopic organic linkers (e.g., at a concentration of 5 mM) are reacted with a compound of formula $M_nX_m$ (e.g., at a concentration of 17.5 mM), where M is cationic Be, Mg, Ca, Ti, V, Cr, Mn, Fe, Co, Ni, Cu, Zn, Zr, Nb, Mo, Ru, Rh, Pd, Cd, or Hf, X is a basic anion, n is a positive (e.g., 1, 2, 3, etc.) and m is a positive integer (e.g., 1, 2, 3, etc.) and the reacting is in the presence of a buffer (e.g., 0.2 M) devoid of metal coordinating functionality. In some such embodiments n is 1, 2, 3, or 4 and m is 1, 2, 3, or 4.

In some embodiments in accordance with the first reaction scheme, M is cationic Fe, Co or Zn. In some embodiments in accordance with the first reaction scheme, n is 2, 3, or 4. In some embodiments in accordance with the first reaction scheme, n is 2. In some embodiments in accordance with the first reaction scheme, n is 5 or 6.

In some embodiments of the first reaction scheme, the pKa value of the basic anion is below 3.5. In some embodiments of the first reaction scheme, the pKa value of the basic anion is above 3.5.

Figure 7A:
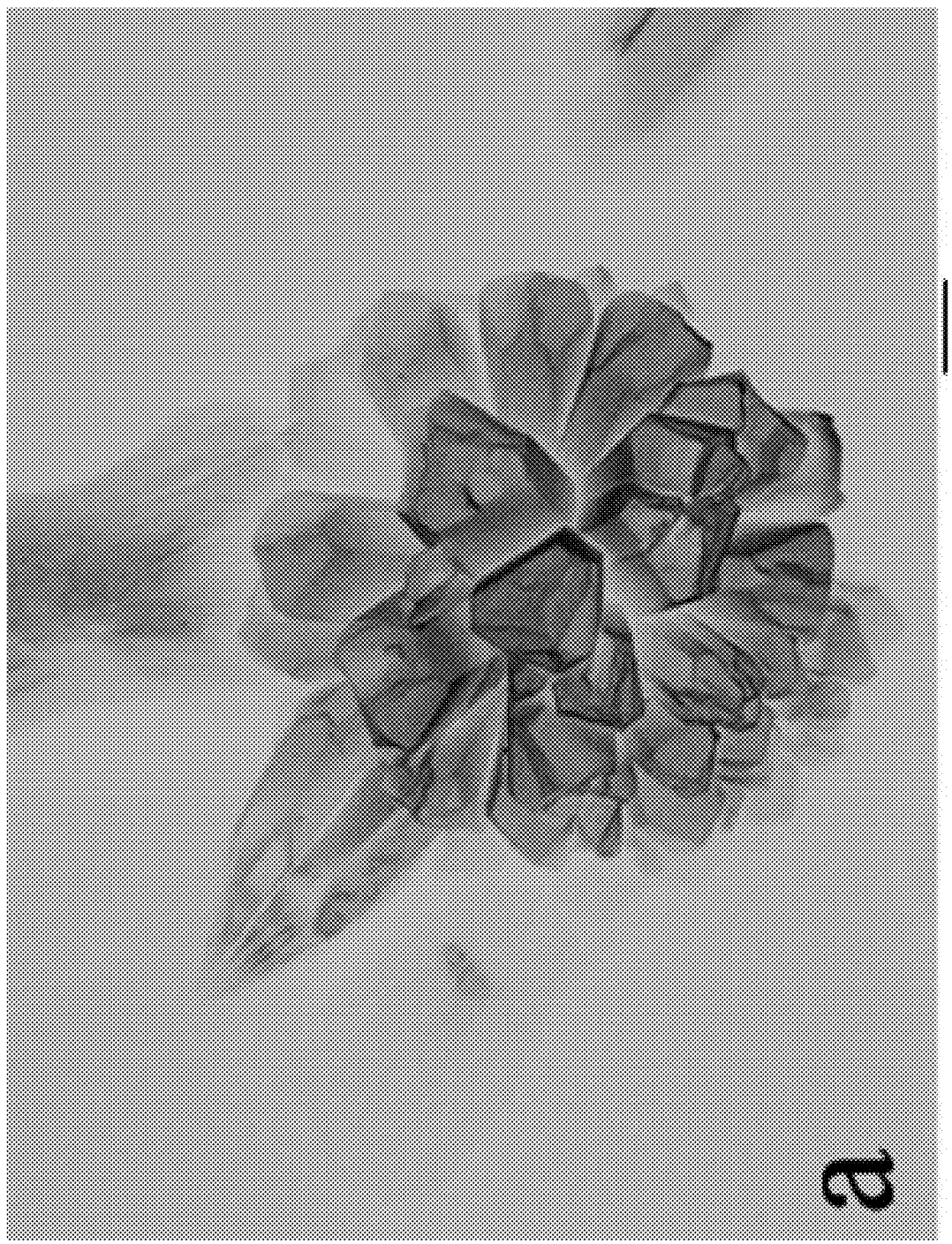
FIG. 7A illustrates an example image of $Co_2$(dobdc), at ×900 magnification, synthesized in the presence of the non-coordinating acid 3-(N-morpholino)propanesulfonic acid with cobalt(II) chloride, in accordance with an embodiment of a first reaction scheme of the present disclosure.
Figure 7B:
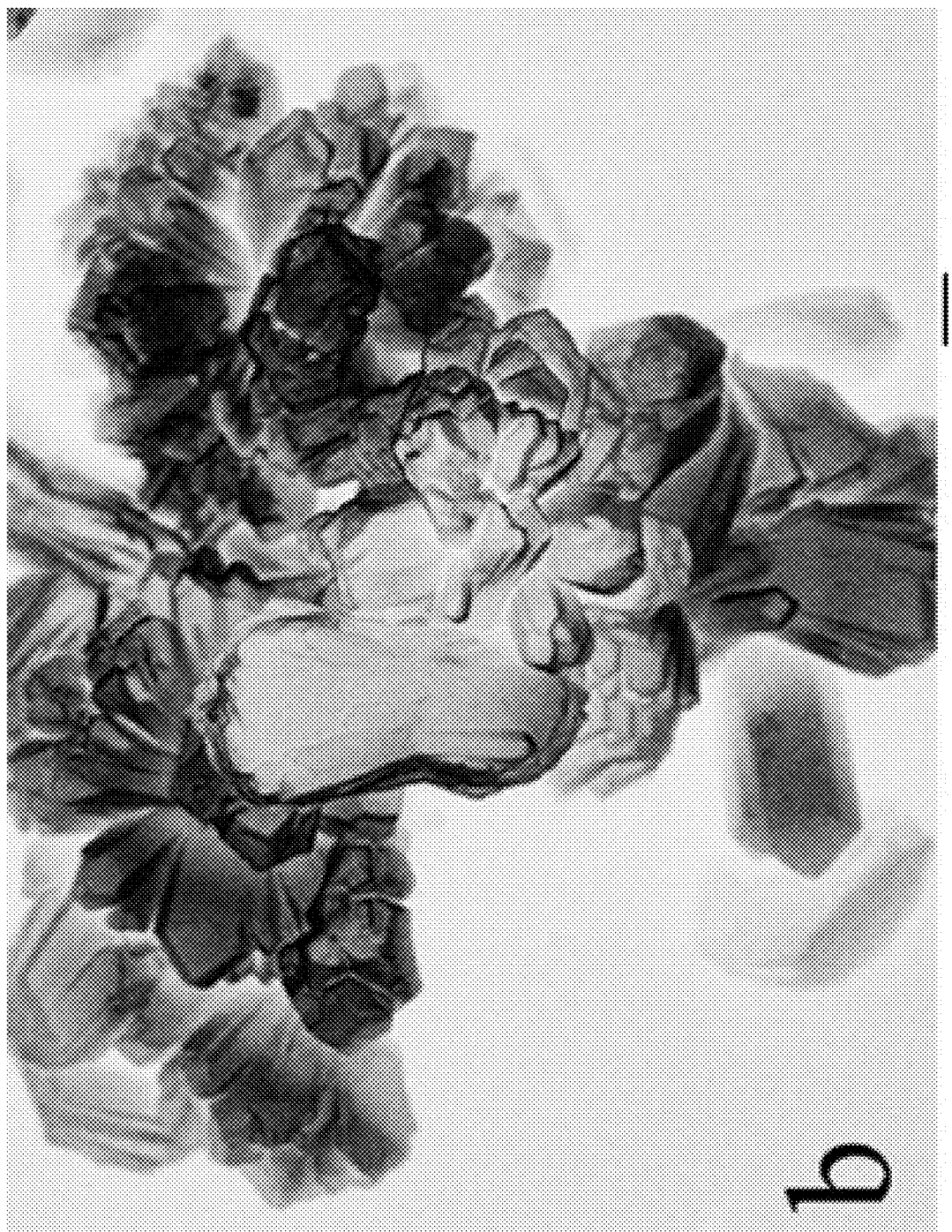
FIG. 7B illustrates an example image of $Co_2$(dobdc), at ×700 magnification, synthesized in the presence of the non-coordinating acid 3-(N-morpholino)propanesulfonic acid with cobalt(II) nitrate, in accordance with an embodiment of a first reaction scheme of the present disclosure.
Figure 7C:
FIG. 7C illustrates an example image of $Co_2$(dobdc), at ×160 magnification, synthesized in the presence of the non-coordinating acid 3-(N-morpholino)propanesulfonic acid with cobalt(II) trifluoroacetate, in accordance with an embodiment of a first reaction scheme of the present disclosure.

In accordance with the first reaction scheme, an amount of crystal growth of the metal-organic framework in the c direction is controlled. As an example the crystalline MOF material $Co_2(dobdc)$ may be formed in accordance with the first reaction scheme from a variety of cobalt(II) salts including cobalt(II) nitrate, cobalt(II) chloride, cobalt(II) acetate, cobalt(II) sulfate, cobalt(II) iodide, cobalt(II) bromide, cobalt(II) trifluorosulfonate, cobalt(II) tetrafluoroborate, cobalt(II) acetylacetonate, cobalt(II) formate, cobalt(II) perchlorate, and halogenated derivatives thereof. When the counterion is sufficiently coordinating, including acetate, sulfate, iodide, bromide, trifluorosulfonate, sulfate, and formate, the resulting crystallites of the first reaction scheme are of low dispersity (FIGS. 3-6). When non-coordinating or weakly-coordinating anions are used, including syntheses containing cobalt(II) chloride, cobalt(II) nitrate, cobalt(II) tetrafluoroborate, and cobalt(II) trifluoroacetate, the metal-organic framework still forms, but morphological control is lost, indicating that controlled growth may be ascribed to coordinative effects (FIG. 7).

In some embodiments of the first reaction scheme, the plurality of polytopic organic linkers are at a concentration of between 1 mM and 1 M, at a concentration of between 3 mM and 0.5 M or at a concentration of between 4 mM and 250 mM.

In some embodiments of the first reaction scheme, each polytopic organic linker in the plurality of polytopic organic linkers has the formula:

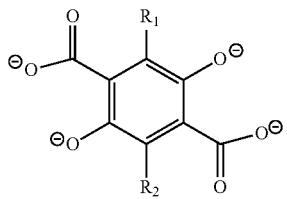

where, $R_1$ and $R_2$ are each independently selected from H, halogen, hydroxyl, methyl, or halogen substituted methyl. In some embodiments of the first reaction scheme $R_1$ and $R_2$ are each hydrogen.

In some embodiments, each polytopic organic linker in the plurality of polytopic organic linkers has the formula:

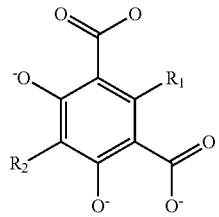

where $R_1$ and $R_2$ are each independently selected from H, halogen, hydroxyl, methyl, or halogen substituted methyl. In some embodiments, $R_1$ and $R_2$ are each hydrogen.

In some embodiments of the first reaction scheme, each polytopic organic linker in the plurality of polytopic organic linkers has the formula:

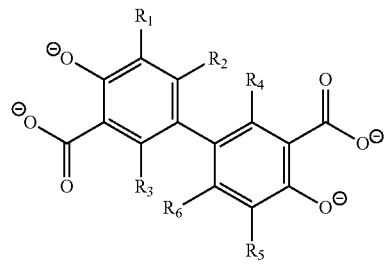

where $R_1$, $R_2$, $R_3$, $R_4$, $R_5$, and $R_6$ are each independently selected from H, halogen, hydroxyl, methyl, or halogen substituted methyl. In some embodiments of the first reaction scheme, $R_1$, $R_2$, $R_3$, $R_4$, $R_5$, and $R_6$ are each hydrogen.

In some embodiments of the first reaction scheme, each polytopic organic linker in the plurality of polytopic organic linkers has the formula:

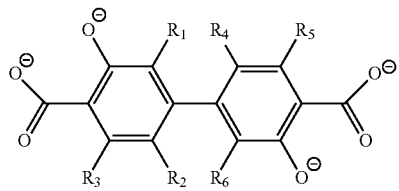

where $R_1$, $R_2$, $R_3$, $R_4$, $R_5$, and $R_6$ are each independently selected from H, halogen, hydroxyl, methyl, or halogen substituted methyl. In some such embodiments of the first reaction scheme, $R_1$, $R_2$, $R_3$, $R_4$, $R_5$, and $R_6$ are each hydrogen.

In some embodiments of the first reaction scheme, each polytopic organic linker in the plurality of polytopic organic linkers is: 2,5-di oxido-1,4-benzenedicarboxylate ($dobdc^{4-}$), 4,6-dioxido-1,3-benzenedicarboxylate ($m\text{-}dobdc^{4-}$), 4,4'-dioxidobiphenyl-3,3'-dicarboxylate ($dobpdc^{4-}$), 4,4''-dioxido-[1,1':4',1''-terphenyl]-3,3'''-dicarboxylate ($dotpdc^{4-}$), dioxidobiphenyl-4,4'-dicarboxylate (para-carboxylate-$dobpdc^{4-}$, also referred to as pc-$dobpdc^{4-}$), 2,5-dioxidobenzene-1,4-dicarboxylate ($dobdc^{4-}$), 1,3,5-benzenetristetrazolate (BTT), 1,3,5-benzenetristriazolate (BTTri), 1,3,5-benzenetrispyrazolate (BTP), or 1,3,5-benzenetriscarboxylate (BTC).

In some embodiments of the first reaction scheme, each polytopic organic linker in the plurality of polytopic organic linkers is 2,5-dioxido-1,4-benzenedicarboxylate ($dobdc^{4-}$).

In some embodiments of the first reaction scheme, the reacting occurs at a temperature less than 30° C. for two to three days, at a temperature less than 40° C. for less than one or two days, at a temperature less than 45° C. between 10 and 25 hours, at a temperature less than 50° C. for at least eleven hours, at a temperature less than 60° C. for at least eight hours, at a temperature less than 70° C. for at least two hours, at a temperature less than 80° C. for at least 30 minutes, or at a temperature less than 90° C. for at least 10 minutes.

In some embodiments of the first reaction scheme, the reacting occurs at a temperature between 30° C. and 50° C. for two to three days, at a temperature between 35° C. and 55° C. for between one and three days, at a temperature between 40° C. and 60° C. for between 10 and 25 hours, at a temperature between 45° C. and 70° C. for at least eleven hours, at a temperature of between 45° C. and 70° C. for at least eight hours, at a temperature between 60° C. and 80° C. for at least two hours, at a temperature between 70° C. and 90° C. for at least 30 minutes, or at a temperature between 80° C. and 100° C. for at least 10 minutes.

In some embodiments of the first reaction scheme, the reacting occurs at a temperature greater than 60° C. for at least eight hours, at a temperature greater than 60° C. for at least nine hours, at a temperature greater than 60° C. for at least ten hours, at a temperature greater than 60° C. for at least eleven hours, at a temperature greater than 60° C. for at least twelve hours, at a temperature greater than 60° C. for at least thirteen hours, at a temperature greater than 60° C. for at least fourteen hours, or at a temperature greater than 60° C. for at least fifteen hours.

In some embodiments of the first reaction scheme, the reacting occurs at a temperature greater than 62° C. for at least eight hours, at a temperature greater than 62° C. for at least nine hours, at a temperature greater than 62° C. for at least ten hours, at a temperature greater than 62° C. for at least eleven hours, at a temperature greater than 62° C. for at least twelve hours, at a temperature greater than 62° C. for at least thirteen hours, at a temperature greater than 62° C. for at least fourteen hours, or at a temperature greater than 62° C. for at least fifteen hours.

In some embodiments of the first reaction scheme, the reacting occurs at a temperature greater than 64° C. for at least eight hours, at a temperature greater than 64° C. for at least nine hours, at a temperature greater than 64° C. for at least ten hours, at a temperature greater than 64° C. for at least eleven hours, at a temperature greater than 64° C. for at least twelve hours, at a temperature greater than 64° C. for at least thirteen hours, at a temperature greater than 64° C. for at least fourteen hours, or at a temperature greater than 64° C. for at least fifteen hours.

In some embodiments of the first reaction scheme, the reacting occurs at a temperature greater than 66° C. for at least eight hours, at a temperature greater than 66° C. for at least nine hours, at a temperature greater than 66° C. for at least ten hours, at a temperature greater than 66° C. for at least eleven hours, at a temperature greater than 66° C. for at least twelve hours, at a temperature greater than 66° C. for at least thirteen hours, at a temperature greater than 66° C. for at least fourteen hours, or at a temperature greater than 66° C. for at least twenty hours.

In some embodiments of the first reaction scheme, the reacting occurs at a temperature greater than 68° C. for at least eight hours, at a temperature greater than 68° C. for at least nine hours, at a temperature greater than 68° C. for at least ten hours, at a temperature greater than 68° C. for at least eleven hours, at a temperature greater than 68° C. for at least twelve hours, at a temperature greater than 68° C. for at least thirteen hours, at a temperature greater than 68° C. for at least fourteen hours, or at a temperature greater than 68° C. for at least twenty hours.

In some embodiments of the first reaction scheme, the reacting occurs at a temperature greater than 70° C. for at least eight hours, at a temperature greater than 70° C. for at least nine hours, at a temperature greater than 70° C. for at least ten hours, at a temperature greater than 70° C. for at least eleven hours, at a temperature greater than 70° C. for at least twelve hours, at a temperature greater than 70° C. for at least thirteen hours, at a temperature greater than 70° C. for at least fourteen hours, or at a temperature greater than 70° C. for at least twenty hours.

In some embodiments of the first reaction scheme, the reacting occurs at a temperature greater than 72° C. for at least eight hours, at a temperature greater than 72° C. for at least nine hours, at a temperature greater than 72° C. for at least ten hours, at a temperature greater than 72° C. for at least eleven hours, at a temperature greater than 72° C. for at least twelve hours, at a temperature greater than 72° C. for at least thirteen hours, at a temperature greater than 72° C. for at least fourteen hours, or at a temperature greater than 72° C. for at least twenty hours.

In some embodiments of the first reaction scheme, the reacting occurs at a temperature greater than 74° C. for at least eight hours, at a temperature greater than 74° C. for at least nine hours, at a temperature greater than 74° C. for at least ten hours, at a temperature greater than 74° C. for at least eleven hours, at a temperature greater than 74° C. for at least twelve hours, at a temperature greater than 74° C. for at least thirteen hours, at a temperature greater than 74° C. for at least fourteen hours, or at a temperature greater than 74° C. for at least twenty hours.

In some embodiments of the first reaction scheme, the compound of formula $M_nX_m$ is at a concentration of between 5 mM and 1 M, between 10 mM and 0.5 M, or between 15 mM and 250 mM.

In some embodiments of the first reaction scheme, the buffer devoid of metal coordinating functionality is PIPES, PIPPS, PIPBS, DEPP, DESPEN, MES, TEEN, PIPES, MOBS, DESPEN, or TEMN. In some embodiments of the first reaction scheme, the buffer devoid of metal coordinating functionality is an alkyl or alkylsulfonate derivative of morpholine, piperazine, ethylenediamine, or methylenediamine. See Kandegedara and Rorabacher, 1999, Anal. Chem. 71, 3140, which is hereby incorporated by reference.

In some embodiments of the first reaction scheme, the buffer devoid of metal coordinating functionality is buffered to a concentration of between 0.05 M and 0.5 M, between 0.10 M and 0.4 M, between 0.15 M and 0.30 M, or between 0.18 M and 0.22 M in the reaction. In some embodiments, the buffer devoid of metal coordinating functionality is buffered to a pH of below 5.0, between 5.0 and 6.0, between 6.0 and 7.0, between 7.0 and 8.0, or above 8.0.

In some embodiments of the first reaction scheme, the buffer devoid of metal coordinating functionality does not measureably interact with or ligate to the metal cations of the crystalline metal-organic framework.

In some embodiments of the first reaction scheme, the reacting occurs in a polar protic solvent or a mixture of polar protic solvents. In some embodiments of the first reaction scheme, the reacting occurs in an ethanol:water solvent mixture. In some embodiments of the first reaction scheme, the reacting occurs in a x:y mixture of ethanol and water, where x and y are independent separate positive integers. In some embodiments of the first reaction scheme, the reacting occurs in t-butanol, n-propanol, ethanol, methanol, acetic acid, water, or a mixture thereof.

Figure 8:
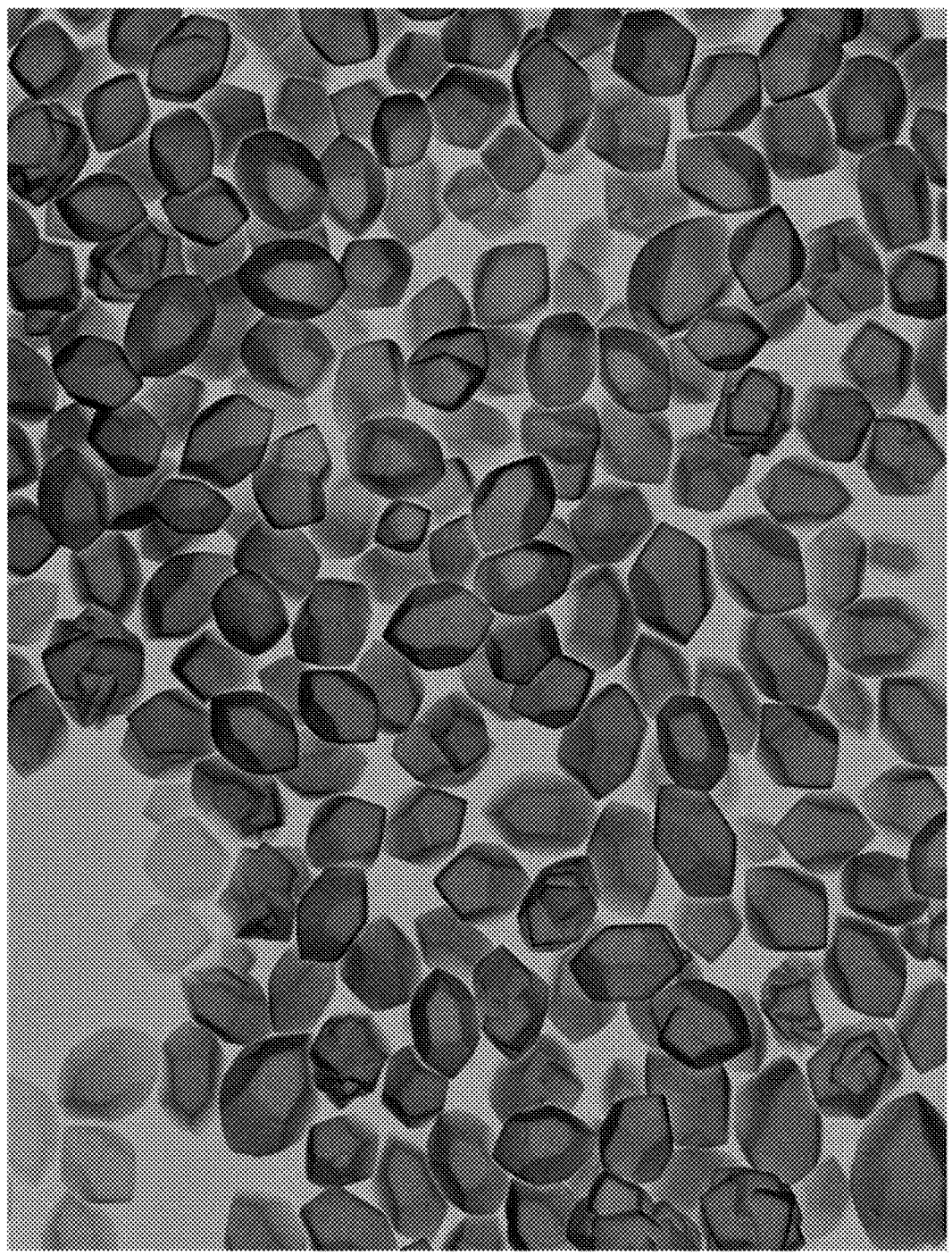
FIG. 8 illustrates an example image of $Co_2$(dobdc), at ×1500 magnification, synthesized without a non-coordinating buffer, using cobalt(II) acetate, in accordance with an embodiment of a first reaction scheme of the present disclosure.
Figure 9A:
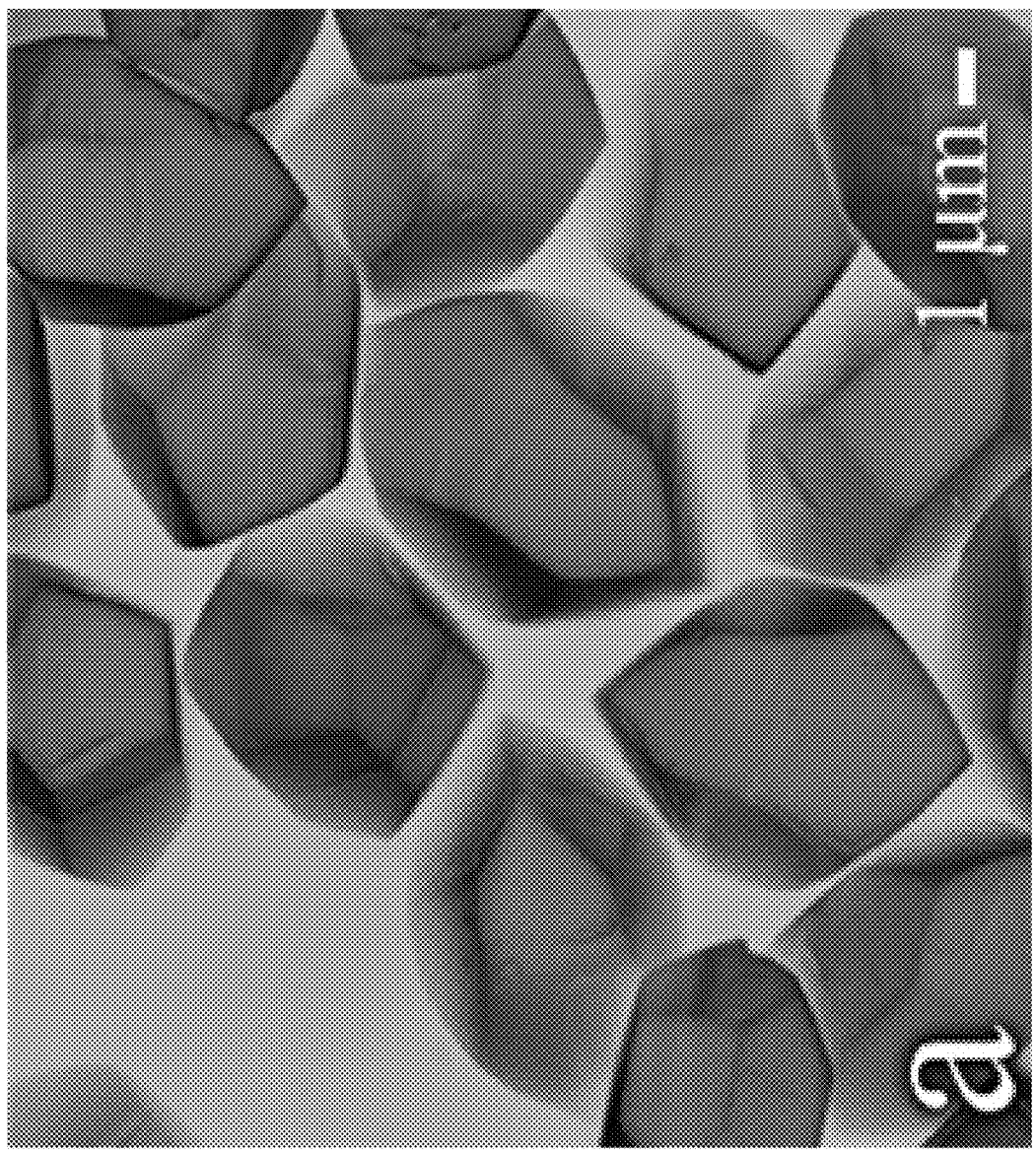
FIG. 9A illustrates an example image of $Co_2$(dobdc) synthesized in the presence of the non-coordinating acid 3-(N-morpholino)propanesulfonic acid with cobalt(II) acetate, in accordance with an embodiment of a first reaction scheme of the present disclosure.
Figure 9B:
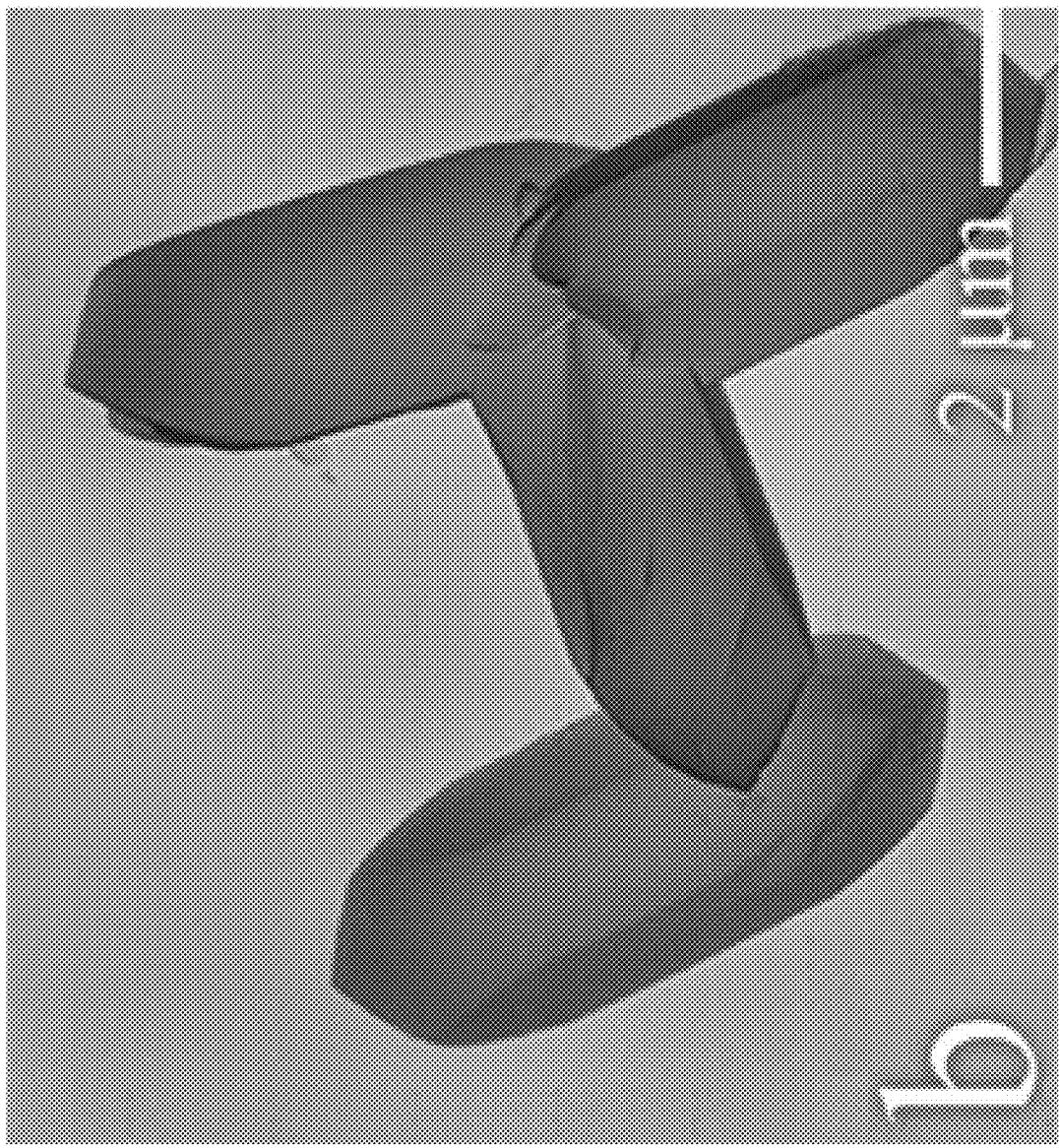
FIG. 9B illustrates an example image of $Co_2$(dobdc) synthesized in the presence of the non-coordinating acid 3-(N-morpholino)propanesulfonic acid with cobalt(II) formate, in accordance with an embodiment of a first reaction scheme of the present disclosure.
Figure 9C:
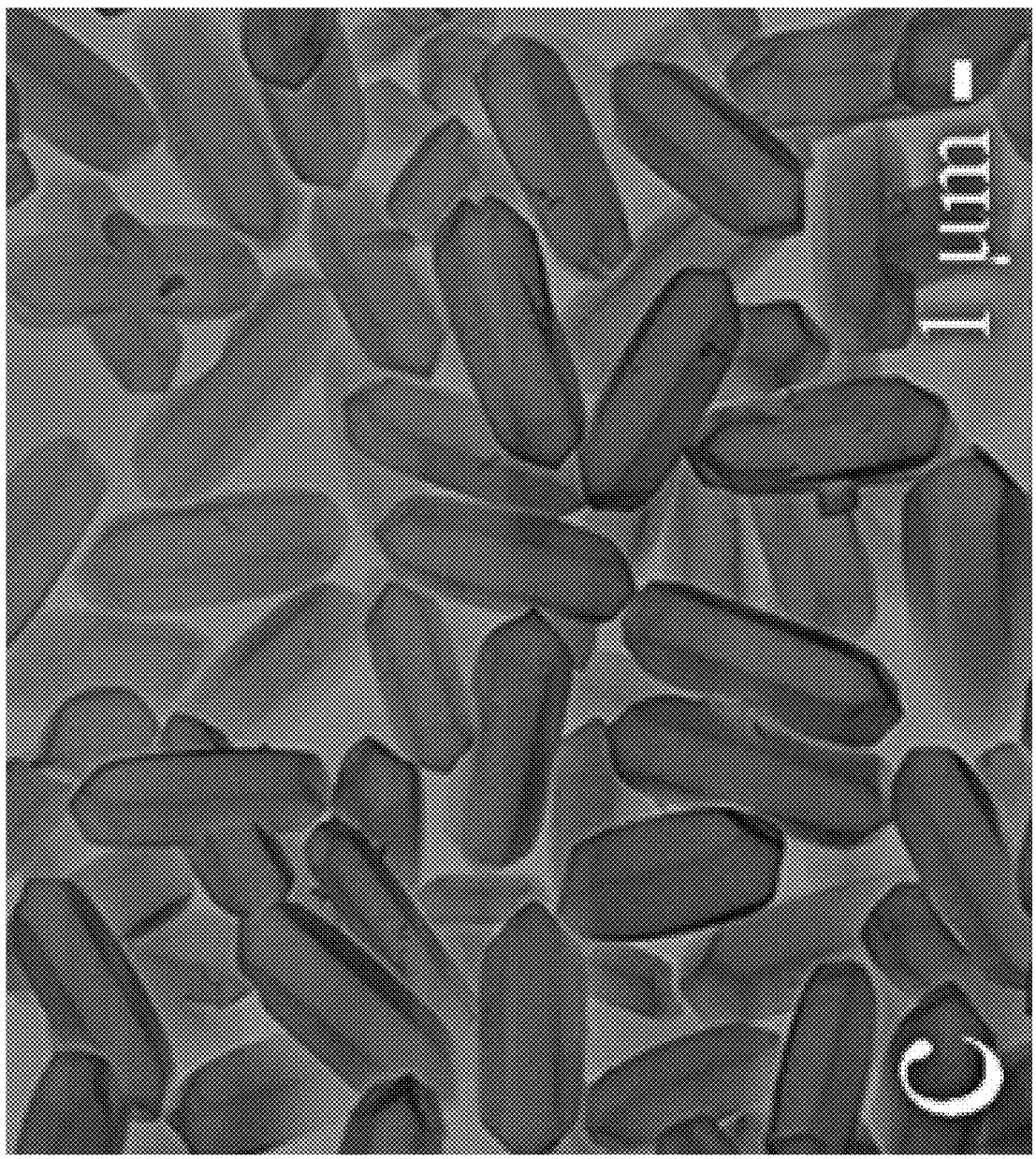
FIG. 9C illustrates an example image of $Co_2$(dobdc) synthesized in the presence of the non-coordinating acid 3-(N-morpholino)propanesulfonic acid with cobalt(II) chloroacetate, in accordance with an embodiment of a first reaction scheme of the present disclosure.
Figure 9D:
FIG. 9D illustrates an example image of $Co_2$(dobdc) synthesized in the presence of the non-coordinating acid 3-(N-morpholino)propanesulfonic acid with cobalt(II) trichloroacetate, in accordance with an embodiment of a first reaction scheme of the present disclosure.
Figure 16:
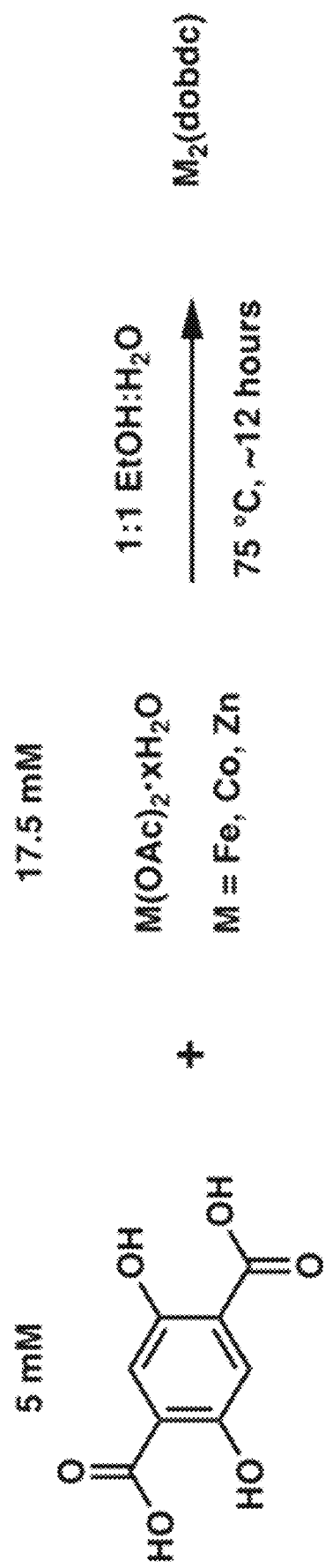
FIG. 16 illustrates an example of a second reaction scheme for the synthesis of a crystalline metal-organic framework, such as $M_2$(dobdc), without a buffer devoid of metal coordinating functionality, when the $pK_a$ value of the basic anion is above the lowest pKa of the ligand molecule, for example where the basic anion is acetate ($pK_a$ 4.76) and the ligand is $dobdc^{4-}$, in accordance with an embodiment of the present disclosure.

Second reaction scheme. Syntheses containing basic anions of a high enough Lewis basicity (including formate and acetate) may be used with or without the buffer devoid of metal coordinating functionality. See, for example FIG. 16, and resulting crystallites of high monodispersity (FIG. 8). The second reaction scheme is identical to the first reaction scheme, in terms of solvents that can be used, reaction time ranges that can be used and reaction temperature ranges that can be used. The difference between the second reaction scheme and first reaction scheme is that the second reaction scheme does not include the buffer devoid of metal coordinating functionality.

Less basic anions (e.g., $pK_a$ less than 4) require the pH control of the buffer to allow the reaction to proceed and thus require the use of the first reaction scheme. However, even these less basic anions (such as sulfate, bromide, iodide, trifluorosulfonate) still result in controlled crystallites. The use of non-coordinating pH control thus allows coordinative control to be extended to these less basic anions.

Figure 10:
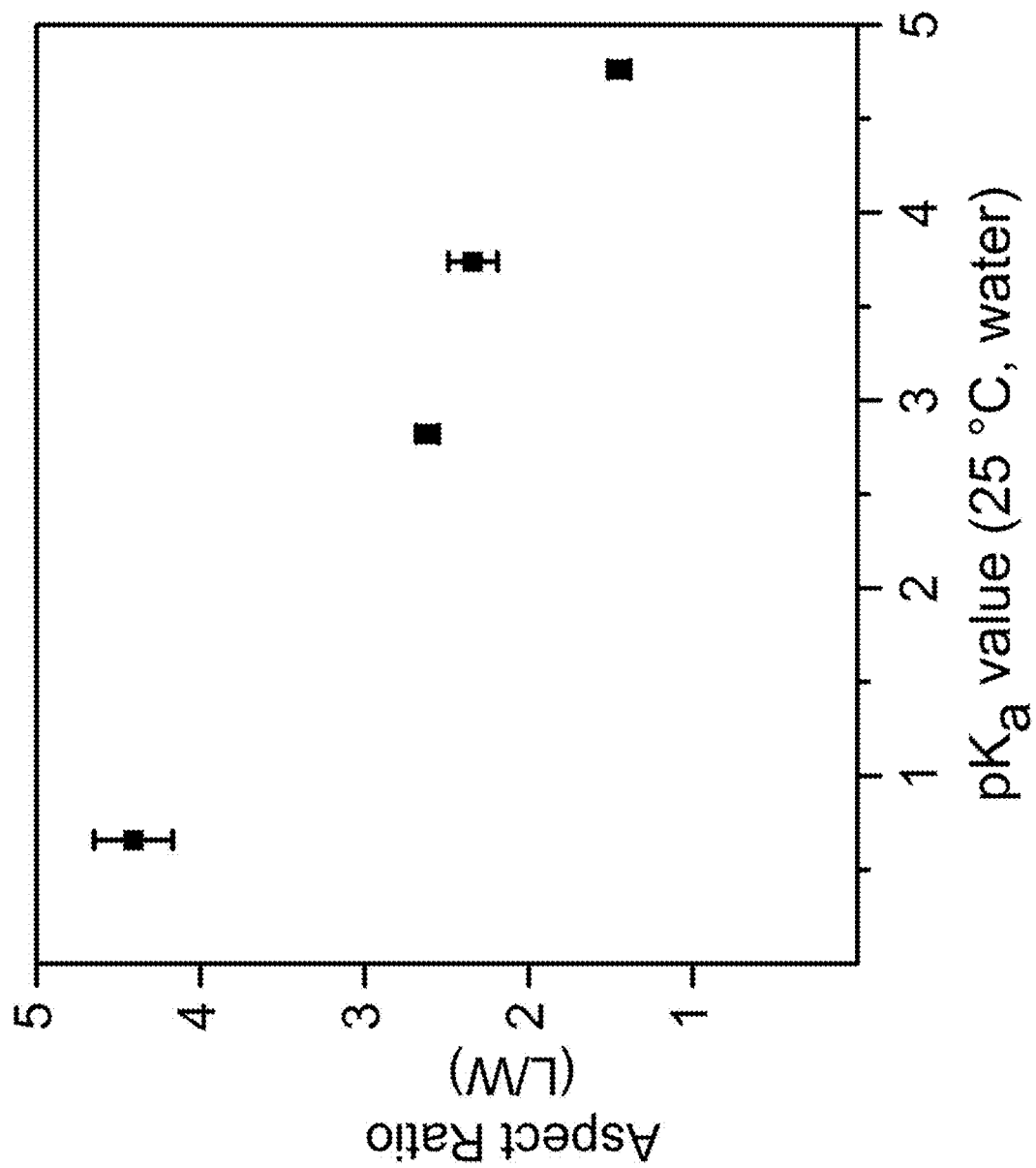
FIG. 10 illustrates how the aspect ratio of the $Co_2$(dobdc) crystallites, synthesized in the presence of a non-coordinating buffer, with functionalized acetate anions is inversely correlated with the literature $pK_a$ values of the conjugate acids, in accordance with an embodiment of the present disclosure.

Further, since controlled growth arises from interactions between the functional group of the basic anion and the surface of the crystallite, the electronics of the functional group may be tuned to result in higher or lower coordinative strength. Using electron-withdrawing groups including fluoro-, chloro-, or bromo- groups, or electron-donating groups including methyl- groups, an anion may be tuned to have lesser or greater electron density on the coordinating functional group. The resulting crystallite length is then inversely correlated with the strength of the anion. A series of halogenated acetates were synthesized following literature procedures (See Marchetti et al., 2007, Inorg. Chem. 2007, 46, 3378; Paul et al., 1970, J. Inorg. Nucl. Chem. 32, 3694; and Lever and Ogden, 1967, Chem. Soc. (A) 2041, each of which is hereby incorporated by reference) and substituted these into the buffered synthesis. By tuning the electron density on the functional group, the coordinative strength of the basic anion used for the compound of formula $M_nX_m$ is precisely controlled and thus used to tune the length of $Co_2$(dobdc) crystallites (FIG. 9). More electron density on the carboxylate allows the anion to compete with the ligand at the terminal end of the metal helix, and shorten the resulting crystallite. In fact, these $pK_a$ values (Table 1, using values from Lide, 2003, *CRC Handbook of Chemistry and Physics*, 84th Edition. CRC Press) have a strong inverse correlation with the resulting aspect ratio (FIG. 10).

TABLE 1

Example list of $pK_a$ values of conjugate acid of anions used in MOF synthesis

| Acid | $pK_a$ (25° C., water) |
| --- | --- |
| Acetic | 4.76 |
| Formic | 3.75 |
| Chloroacetic | 2.87 |
| Trichloroacetic | 0.66 |

Figure 11:
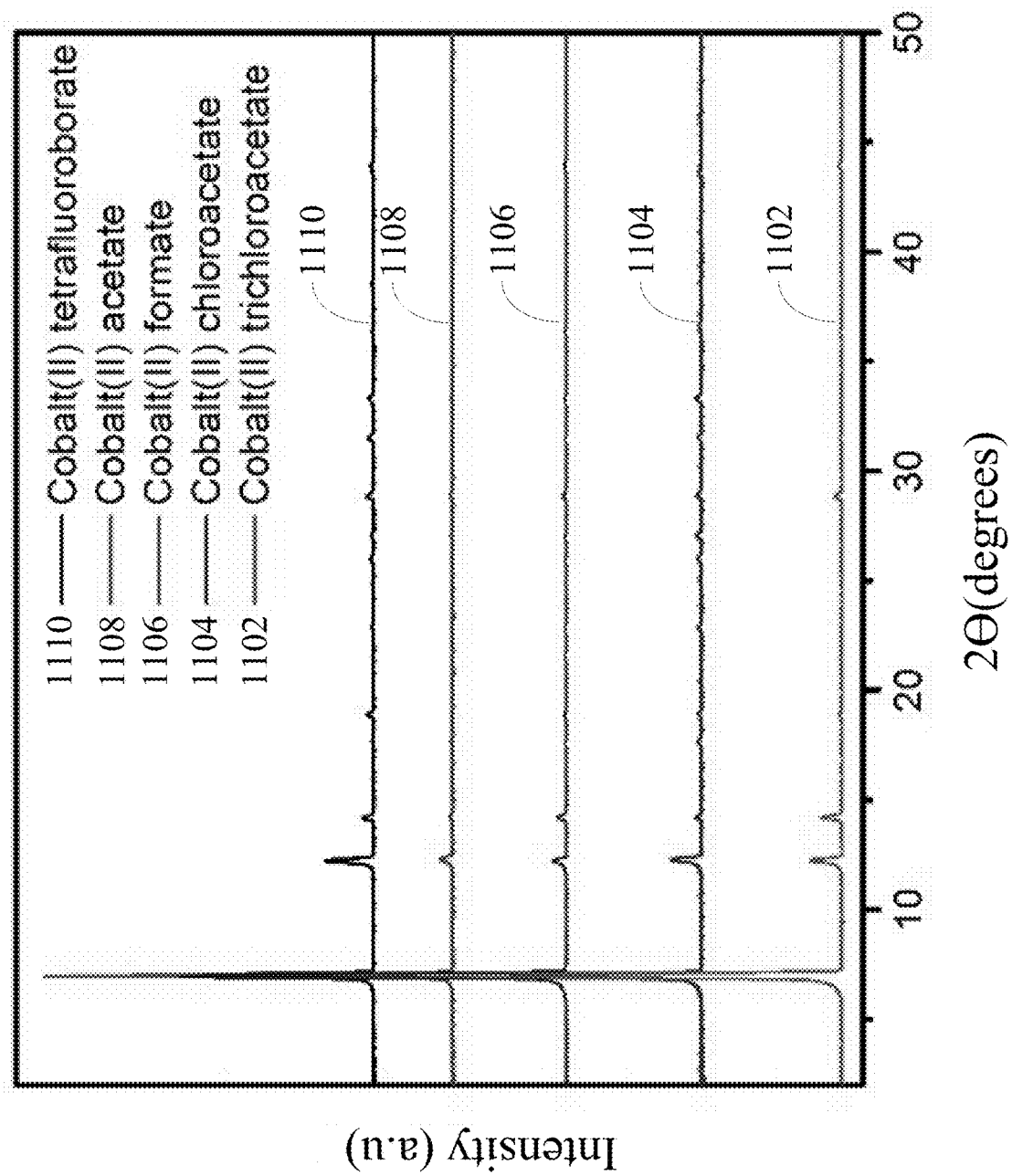
FIG. 11 illustrates powder X-Ray diffraction (pXRD) patterns of $Co_2$(dobdc) crystallites synthesized in the presence of a non-coordinating buffer in accordance with an embodiment of a first reaction scheme of the present disclosure.

The powder X-ray diffraction (pXRD) patterns indicate that the specific MOF syntheses discussed above lead to phase-pure $Co_2$(dobdc) samples (FIG. 11). Using this route, $Co_2$(dobdc) crystallites may be formed in a length range of one micron to twenty microns and in an aspect ratio range of 1.2:1 to 10:1 length to width.

Figure 20:
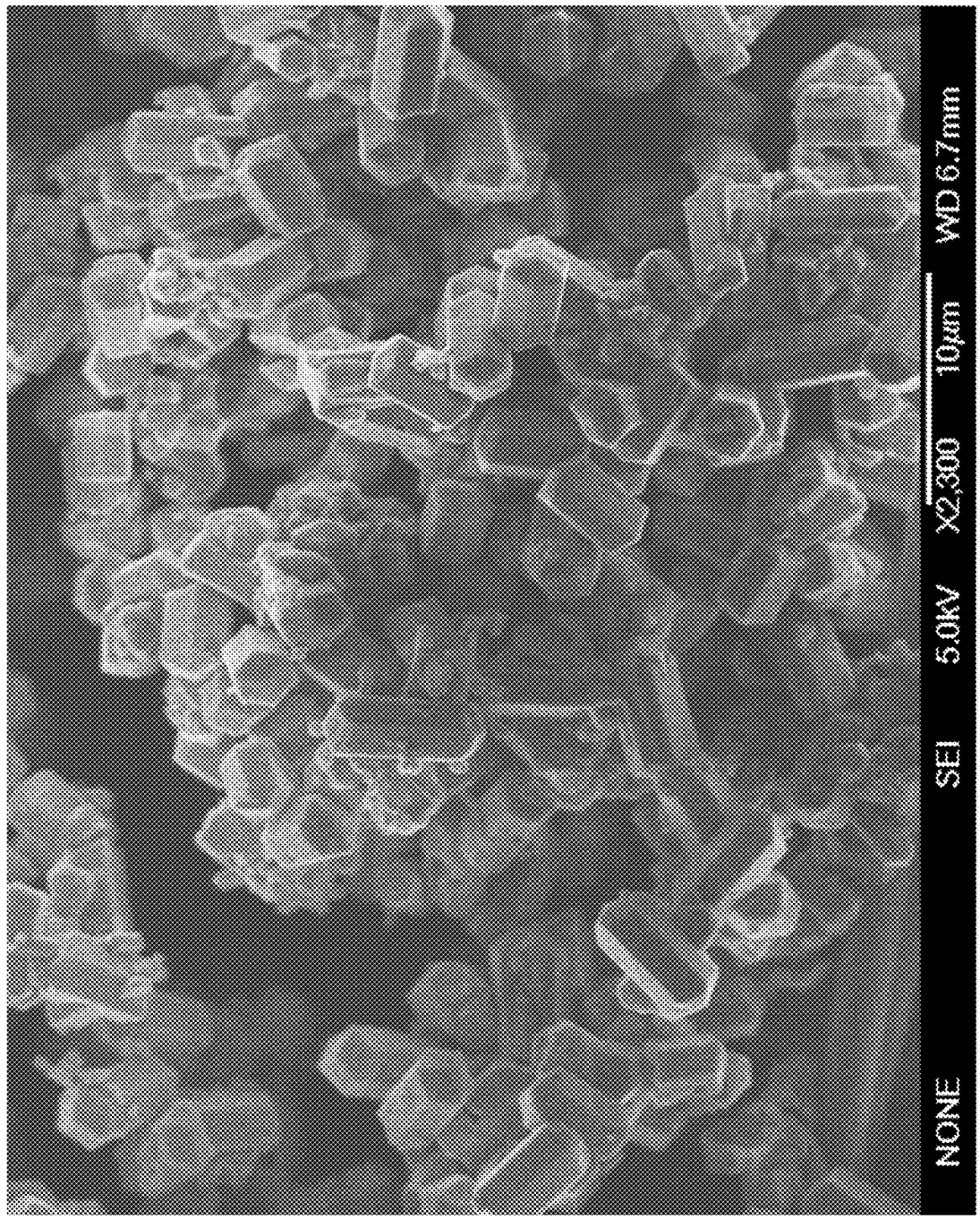
FIG. 20 illustrates an example image of $Fe_2$(dobdc) crystallites, at ×2300 magnification, synthesized in the presence of the non-coordinating acid 3-(N-morpholino)propanesulfonic acid with iron(II) trifluoroacetate, in accordance with an embodiment of the first reaction scheme in the present disclosure.
Figure 21:
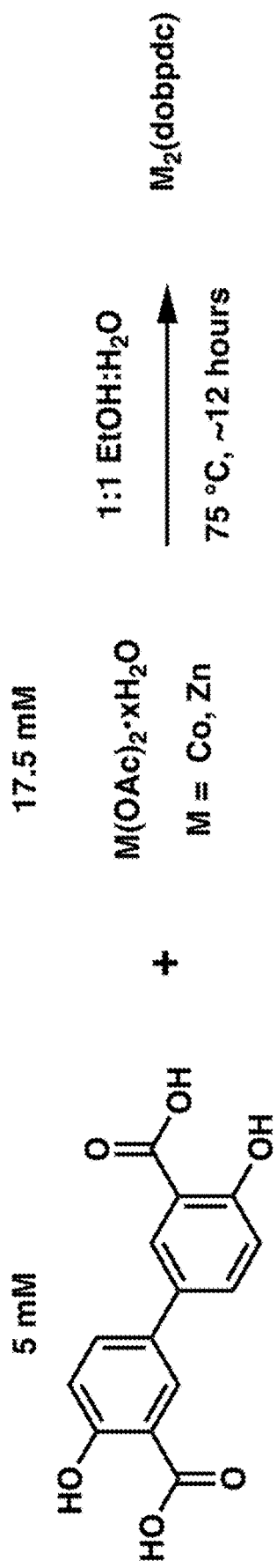
FIG. 21 illustrates an example of a third reaction scheme for the synthesis of a crystalline metal-organic framework, such as $M_2$(dobpdc), without a buffer devoid of metal coordinating functionality, when the $pK_a$ value of the basic anion is above the lowest pKa of the ligand molecule, for example where the basic anion is acetate ($pK_a$ 4.76) relative to the linker $dobpdc^{4-}$, in accordance with an embodiment of the present disclosure.
Figure 22:
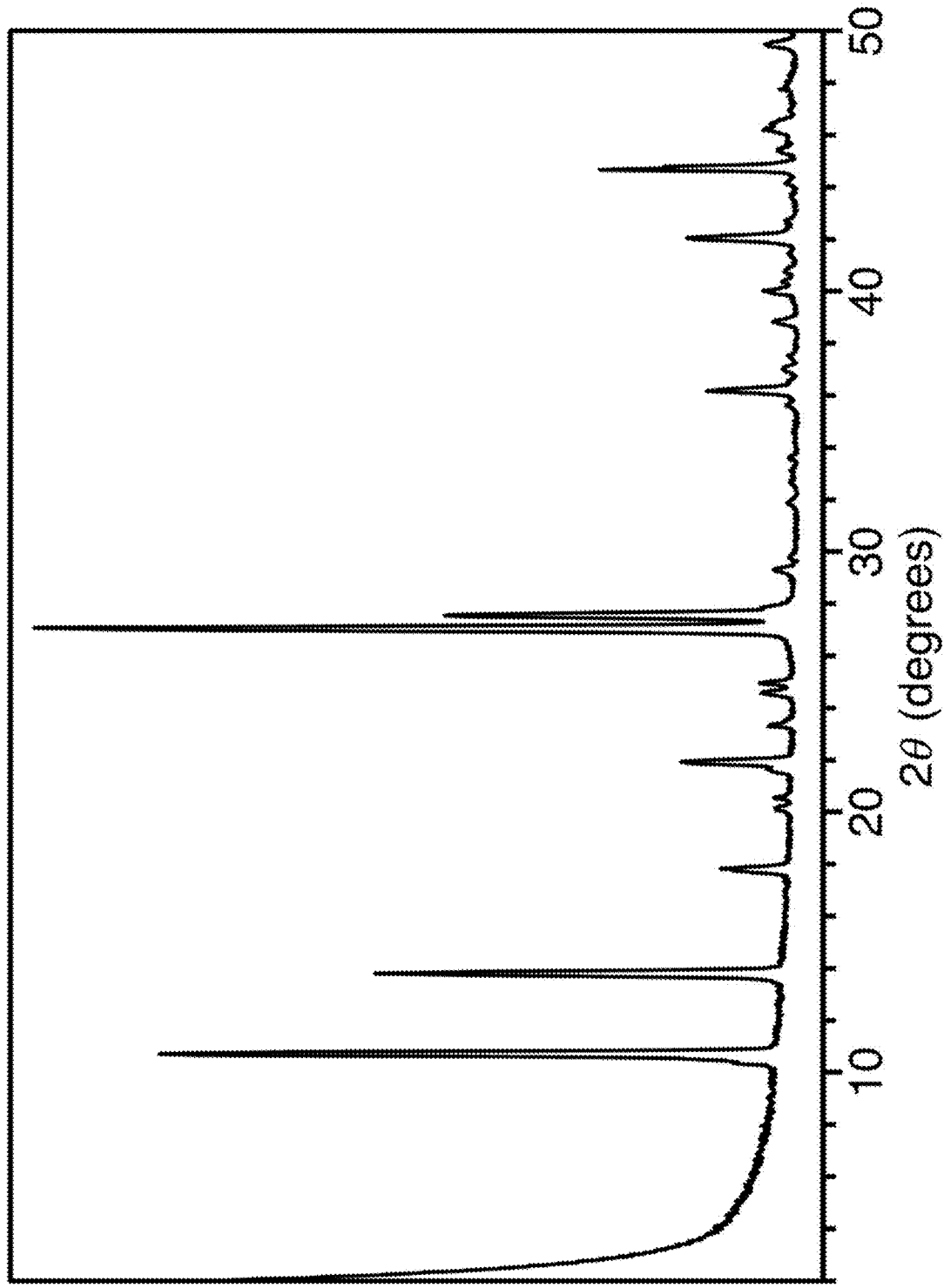
FIG. 22 illustrates the powder X-Ray diffraction (pXRD) pattern of novel $Zn(H_2dobpdc).2H_2O$ crystallites formed in unsilanized glassware in an embodiment of a third reaction scheme of the present disclosure.

Some embodiments of the present disclosure generalize the route other metals, such as $Fe_2$(dobdc), formed in accordance with the first reaction scheme using the anion trifluoroacetate, displaying a truncated crystal size and prominent crystal facets (FIG. 20).

Figure 12A:
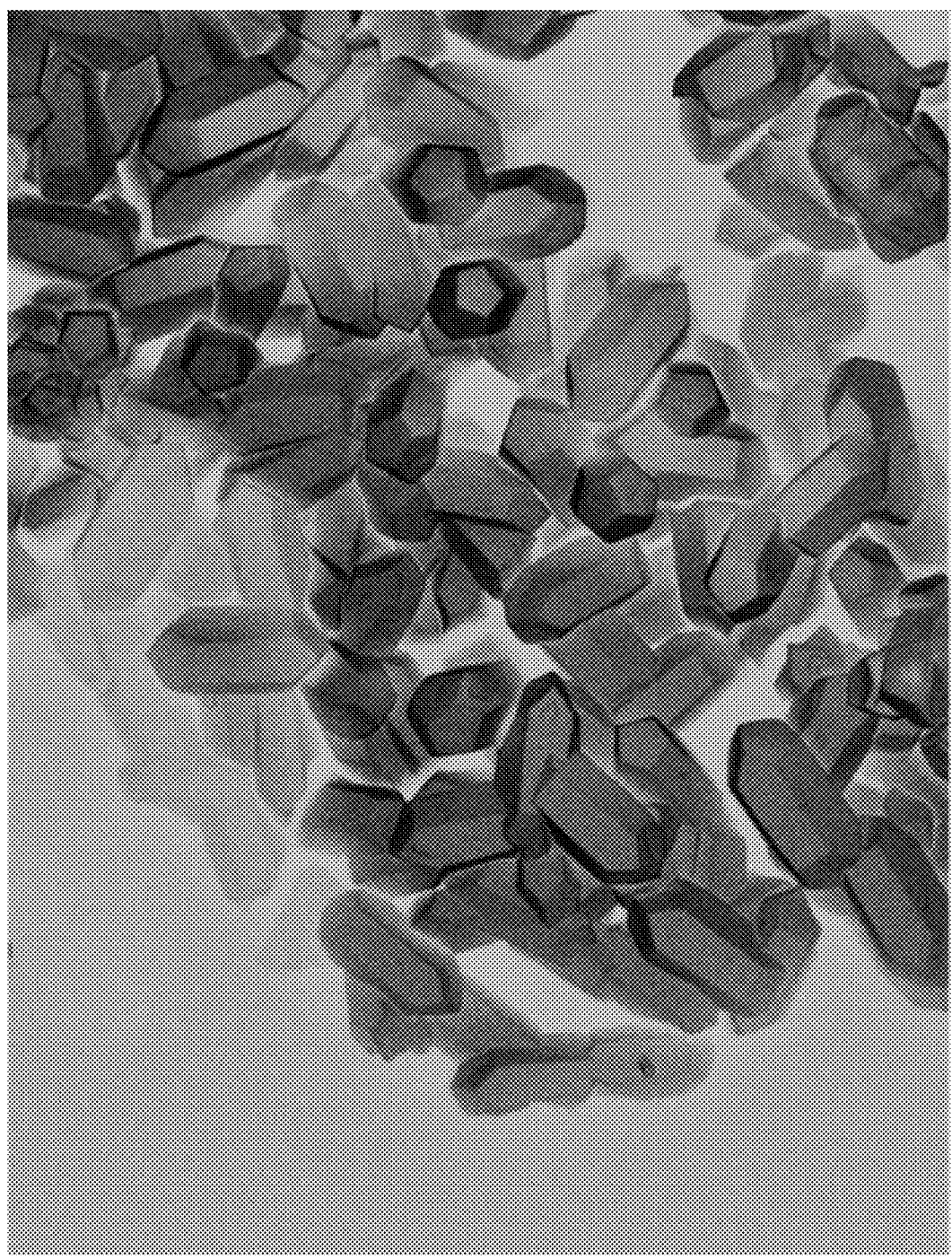
FIG. 12A illustrates an example of $Co_2$(dobdc) crystallites, at ×700 magnification, synthesized without a non-coordinating buffer in an oven, in accordance with an embodiment of a first reaction scheme of the present disclosure.
Figure 12B:
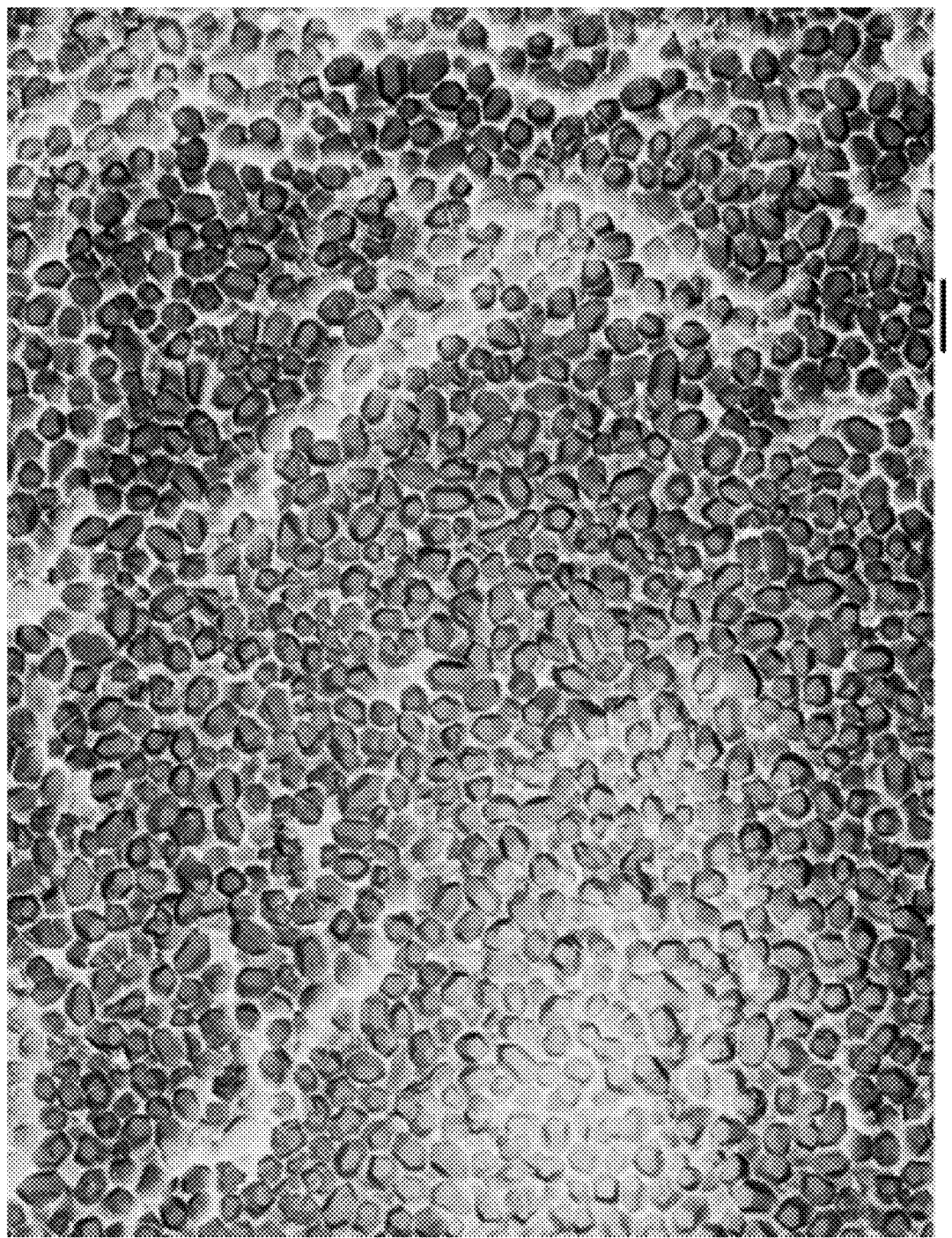
FIG. 12B illustrates an example of $Co_2$(dobdc) crystallites, at ×700 magnification, synthesized without a non-coordinating buffer in an oil bath, in accordance with an embodiment of a first reaction scheme of the present disclosure.

Heating apparatus. During hydrothermal synthesis, the method of providing heat to identical synthesis reactions affects the size, morphology, and dispersity of metal-organic framework samples. The dispersity and size of $Co_2$(dobdc) crystals can be controlled via changes in heating apparatus such as an oil bath, oven, or metal bead bath (FIG. 12). For otherwise identical synthetic conditions, an oil bath is found to improve crystallite dispersity for syntheses done in unsilanized glassware. Examples of metal bead baths are the metal bead bath product line of Lab Armor (Cornelius, Oreg.), including the Lab Armor 74300-714 Waterless Bead Bath, 14 L capacity. Given the discovery that the heat source used affects crystallite dispersity, some embodiments of the present disclosure further specify that the first reaction scheme or the second reaction scheme be done using specific forms or heat sources as disclosed below.

Use of an oil bath. In one embodiment of the present disclosure, the crystalline metal-organic framework is formed in accordance with the first reaction scheme by solubilizing the polytopic organic linker in a first polar protic solvent. Separately, the compound of formula $M_nX_m$ is dissolved in a second polar protic solvent buffered in the presence of a buffer devoid of metal coordinating functionality. In some embodiments the first polar protic solvent and the second polar protic solvent are the same. In some embodiments the first polar protic solvent and the second polar protic solvent are the different. In some alternative embodiments, the polytopic organic linker solution is buffered with the buffer devoid of metal coordinating functionality, not the $M_nX_m$ solution. In still alternative embodiments, both the polytopic organic linker solution and the $M_nX_m$ solution are buffered with the buffer devoid of metal coordinating functionality. The reaction commences upon the mixing of the two solutions, for instance in a 250 mL three-neck, round bottom flask with a Dimroth condenser at 15° C. In some embodiments, the mixed solution is refluxed inside the round bottom flask that is placed in an oil bath at an elevated temperature (e.g., greater than 60° C.) for a period of time (e.g., greater than 10 hours) under agitation (e.g., 300 rpm). At the end of the reaction time, the solution is cooled to room temperature (e.g., by removal from the oil bath or by cooling the oil bath).

In another embodiment of the present disclosure, the crystalline metal-organic framework is formed in accordance with the second reaction scheme by solubilizing the polytopic organic linker in a first polar protic solvent. Separately, the compound of formula $M_nX_m$ is dissolved in a second polar protic solvent. In some embodiments the first polar protic solvent and the second polar protic solvent are the same. In some embodiments the first polar protic solvent and the second polar protic solvent are the different. The reaction commences upon the instant mixing of the two solutions, for instance in a 250 mL three-neck, round bottom flask with a Dimroth condenser at 15° C. In some embodiments, the mixed solution is refluxed inside the round bottom flask that is placed in an oil bath at an elevated temperature (e.g., greater than 60° C.) for a period of time (e.g., greater than 10 hours) under agitation (e.g., 300 rpm). At the end of the reaction time, the solution is cooled to room temperature (e.g., by removal from the oil bath or by cooling the oil bath).

Use of an oven. In one embodiment of the present disclosure, the crystalline metal-organic framework is formed in accordance with the first reaction scheme by solubilizing the polytopic organic linker in a first polar protic solvent. Separately, the compound of formula $M_nX_m$ is dissolved in a second polar protic solvent buffered in the presence of a buffer devoid of metal coordinating functionality. In some embodiments the first polar protic solvent and the second polar protic solvent are the same. In some embodiments the first polar protic solvent and the second polar protic solvent are the different. In some alternative embodiments, the polytopic organic linker solution is buffered with the buffer devoid of metal coordinating functionality, not the $M_nX_m$ solution. In still alternative embodiments, both the polytopic organic linker solution and the $M_nX_m$ solution are buffered with the buffer devoid of metal coordinating functionality. The two solutions are mixed together, for instance in a hermetically sealed autoclave with no agitation (e.g., a 200 mL sized Teflon cup autoclave) oven at room temperature. The reaction is allowed to proceed in this sealed autoclave by placing it statically into a preheated (e.g., at a temperature greater than 60° C.) for a period of time (e.g., greater than 10 hours). At the end of the reaction time, the autoclave is cooled to room temperature (e.g., by removal from the oven or by ambiently cooling the oven).

In another embodiment of the present disclosure, the crystalline metal-organic framework is formed in accordance with the first reaction scheme by solubilizing the polytopic organic linker in a first polar protic solvent. Separately, the compound of formula $M_nX_m$ is dissolved in a second polar protic solvent. In some embodiments the first polar protic solvent and the second polar protic solvent are the same. In some embodiments the first polar protic solvent and the second polar protic solvent are the different. The two solutions are mixed together, for instance in a hermetically sealed autoclave with no agitation (e.g., a 200 mL sized Teflon cup autoclave) at room temperature. The reaction is allowed to proceed in this sealed autoclave by placing it statically into a preheated (e.g., at a temperature greater than 60° C.) oven for a period of time (e.g., greater than 10 hours). At the end of the reaction time, the autoclave is cooled to room temperature along with the oven.

Figure 13A:
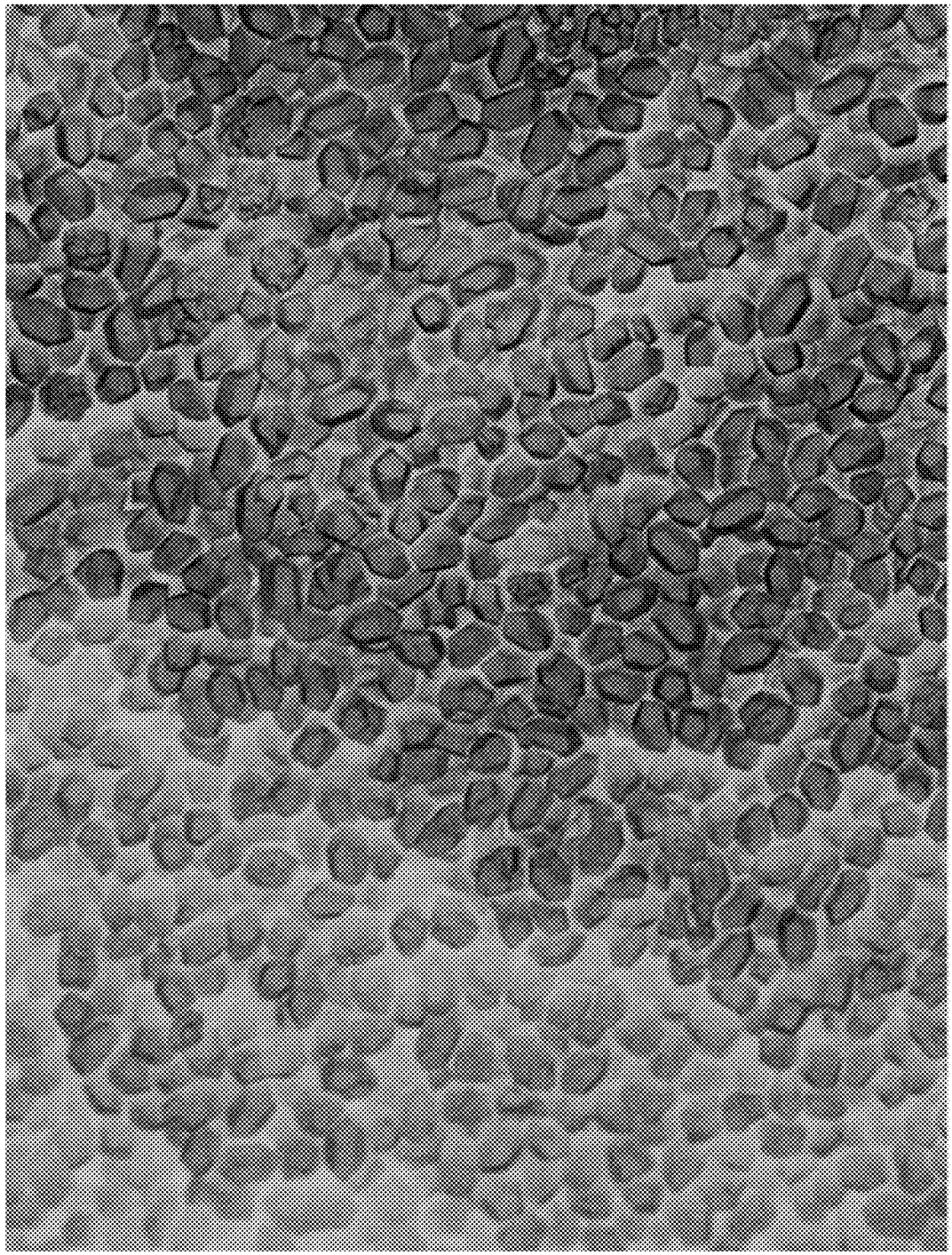
FIG. 13A illustrates an example of $Co_2$(dobdc) crystallites, at ×1200 magnification, synthesized without a non-coordinating buffer in an oil bath with silanized glassware, in accordance with an embodiment of a first reaction scheme of the present disclosure.
Figure 13B:
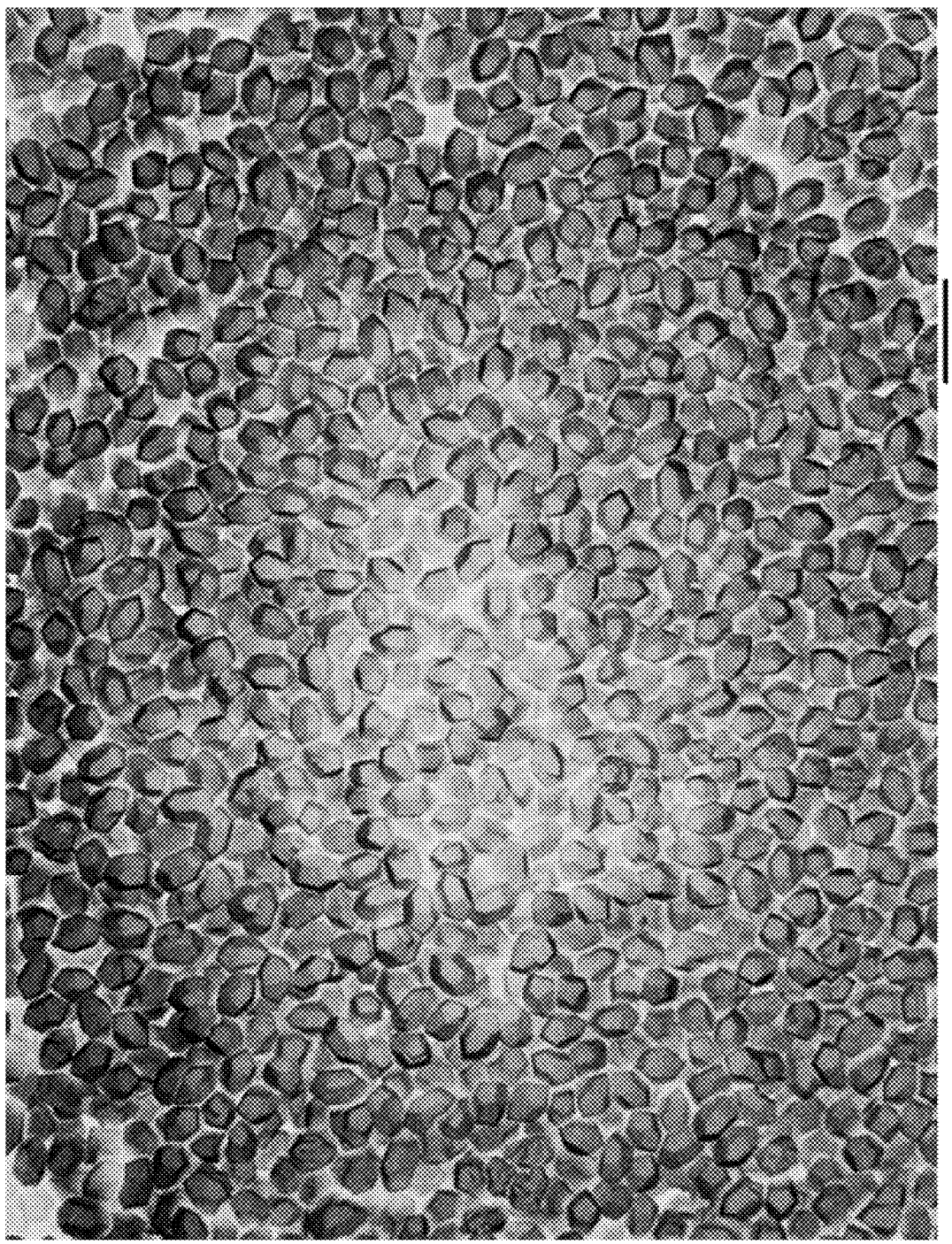
FIG. 13B illustrates an example of $Co_2$(dobdc) crystallites, at ×1000 magnification, synthesized without a non-coordinating buffer in an oven, in accordance with an embodiment of a second reaction scheme of the present disclosure.

Silanization. Different surface functionalities of the reaction vessel can also control the resulting size and dispersity of crystals. Using literature silanizing procedures on borosilicate glassware imparts hydrophobicity to the surfaces. See Seed, 2001, "Silanizing Glassware," Current Protocols in Cell Biology. 8:3E: A.3E.1-A.3E.2, and Plueddemann, 1992, "Chemistry of Silane Coupling Agents," In: Silane Coupling Agents, Springer, Boston, Mass., each of which is incorporated by reference. Aqueous ethanol syntheses done in these silanized glasswares have significantly lower crystal polydispersity. Further, the silanized glassware removed morphological differences stemming from different modes of heating, indicating that it can be used to mitigate synthetic inconsistencies stemming from heating variation (FIG. 13). The silanizing agents that improve morphological control in some embodiments are chlorotrimethylsilane, N,O-bis(trimethylsilyl)acetamide and trichlorohexylsilane. In some embodiments, the silanizing agent used is (3-aminopropyl)-triethoxysilane, (3-aminopropyl)-diethoxy-methylsilane, (3-aminopropyl)-dimethyl-ethoxysilane, (3-aminopropyl)-trimethoxysilane, (3-glycidoxypropyl)-dimethyl-ethoxysilane, (3-mercaptopropyl)-trimethoxysilane, (3-mercaptopropyl)-methyl-dimethoxysilane, or a mixture thereof. In some embodiments, the silanizing agent used is one including a long hydrocarbon chain, such as octadecyltrichlorosilane, dodecyltrichlorosilane, or a mixture thereof. In some embodiments, the surface is functionalized to be more hydrophilic, rather than more hydrophobic. In some such embodiments, the silanizing agent imparts specific functionality to the surface. In some embodiments, this includes perfluoroalkanes or other alkane functionalizations such as alcohols, carboxylic acids, amides, amines, or a mixture thereof.

Figure 19:
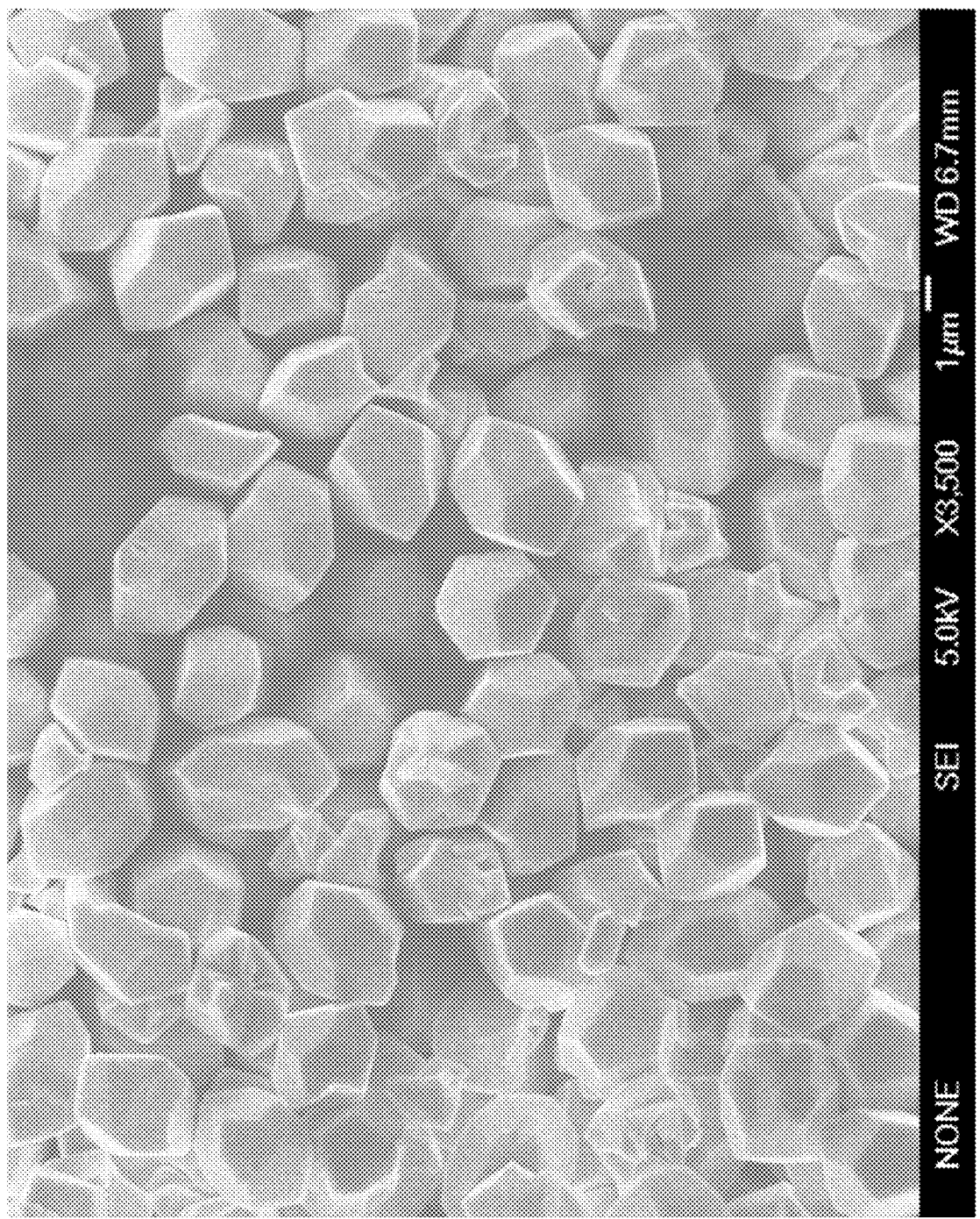
FIG. 19 illustrates an example image of $Co_2$(dobdc) crystallites, at ×3500 magnification, synthesized in a benign (e.g. plastic or steel) reaction vessel, in accordance with an embodiment of the second reaction scheme in the present disclosure.

Further, using benign surfaces such as plastic or steel may also lead to crystals of low dispersity. For example, referring to FIG. 19, aqueous ethanol syntheses done in these benign surfaces have significantly lower crystal polydispersity relative to unsilanized surfaces, such as for crystallites of $Co_2(dobdc)$ formed in accordance with the second reaction scheme.

Figure 14:
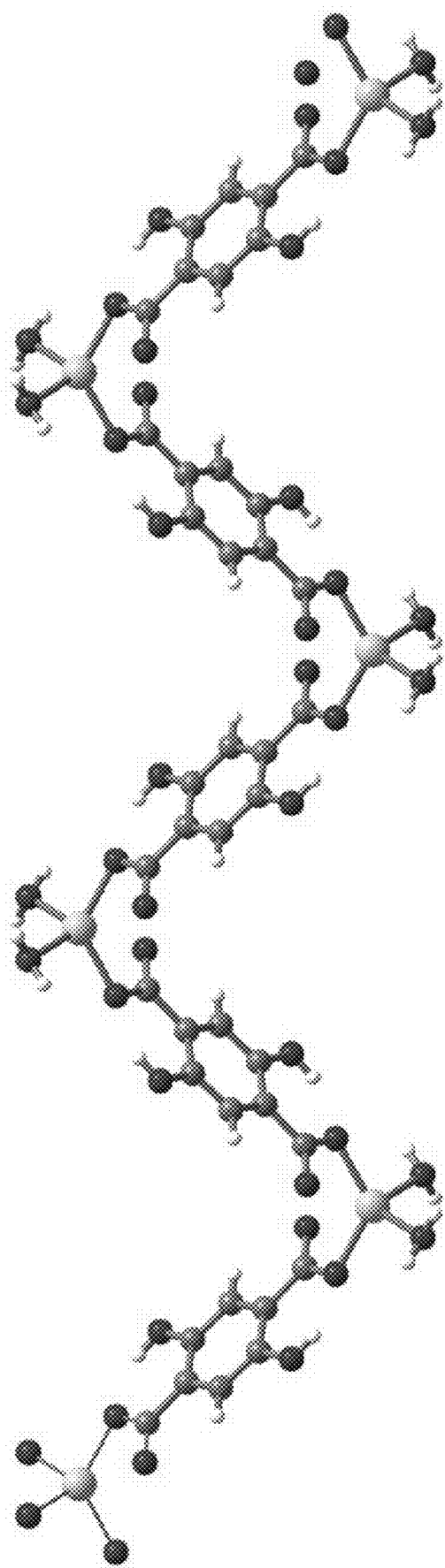
FIG. 14 illustrates the molecular structure of $Zn(H_2dobdc).2H_2O$, a one-dimensional chain consisting of tetrahedral divalent zinc ions and the doubly-deprotonated ligand.
Figure 17:
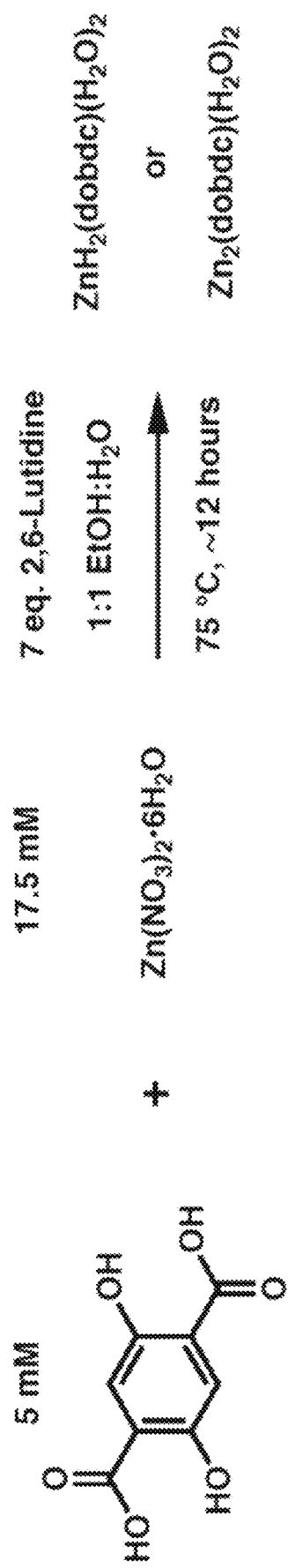
FIG. 17 illustrates a reaction whose product and size are dependent on the surface functionality of the glassware, where the reaction done in silanized glassware leads to $Zn_2$(dobdc), and the reaction done in unsilanized glassware leads to, in some cases, a combination of $Zn_2$(dobdc) and $Zn(H_2dobdc).2H_2O$, and further where $Zn_2$(dobdc) crystallite size is 5-20 microns as synthesized in unsilanized glassware, and 50-400 microns as synthesized in silanized glassware, in accordance with an embodiment of the present disclosure.

Further, use of different surface functionalities can determine phase selection. For example, referring to FIG. 17, identical reaction conditions can go to two different products depending on the surface functionality of the reaction vessel. Unsilanized glassware for the reaction of FIG. 17 leads to the formation of a mixture of $Zn_2(dobdc)$ and $Zn(H_2dobdc)$.$2H_2O$, where the latter is a one-dimensional chain consisting of tetrahedral divalent zinc ions and the doubly-deprotonated ligand (FIG. 14). This may also be accomplished using benign surfaces e.g. plastic and steel. The surface functionality be it silanized, unsilanized, or other materials during synthesis thus selects for phase for this material in some cases. Silanized glassware leads to solely or predominantly $Zn_2(dobdc)$ formation. Using different functionalities on glassware e.g. silanized or unsilanized surfaces may also lead to the discovery of new phases, such as $Zn(dobpdc)$. $2H_2O$, formed in accordance with the third reaction scheme.

Figure 18A:
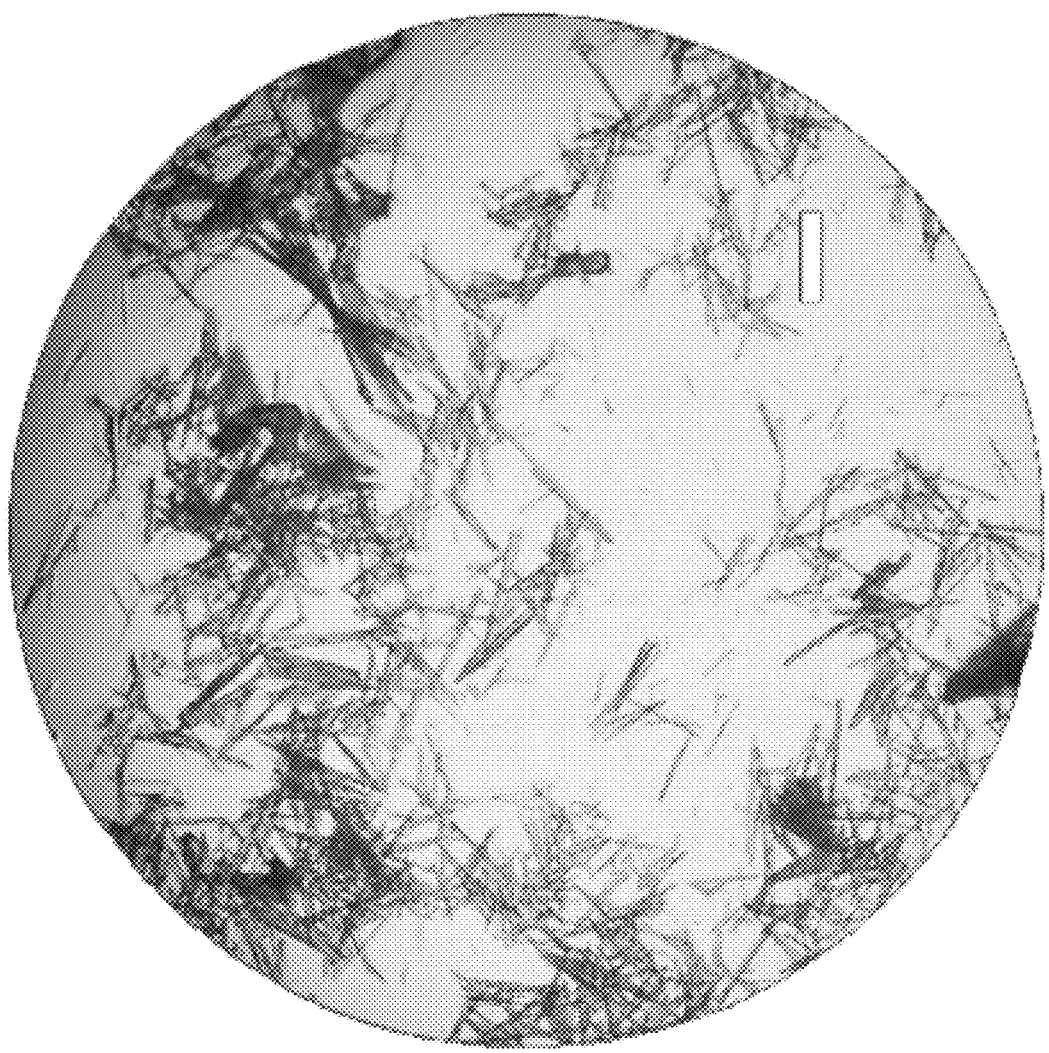
FIG. 18A illustrates an example image of $Zn_2$(dobpdc) crystallites, at ×50 magnification, synthesized in unsilanized glassware, whose size is dependent on the surface functionality of the glassware, in accordance with an embodiment of a third reaction scheme in the present disclosure.
Figure 18B:
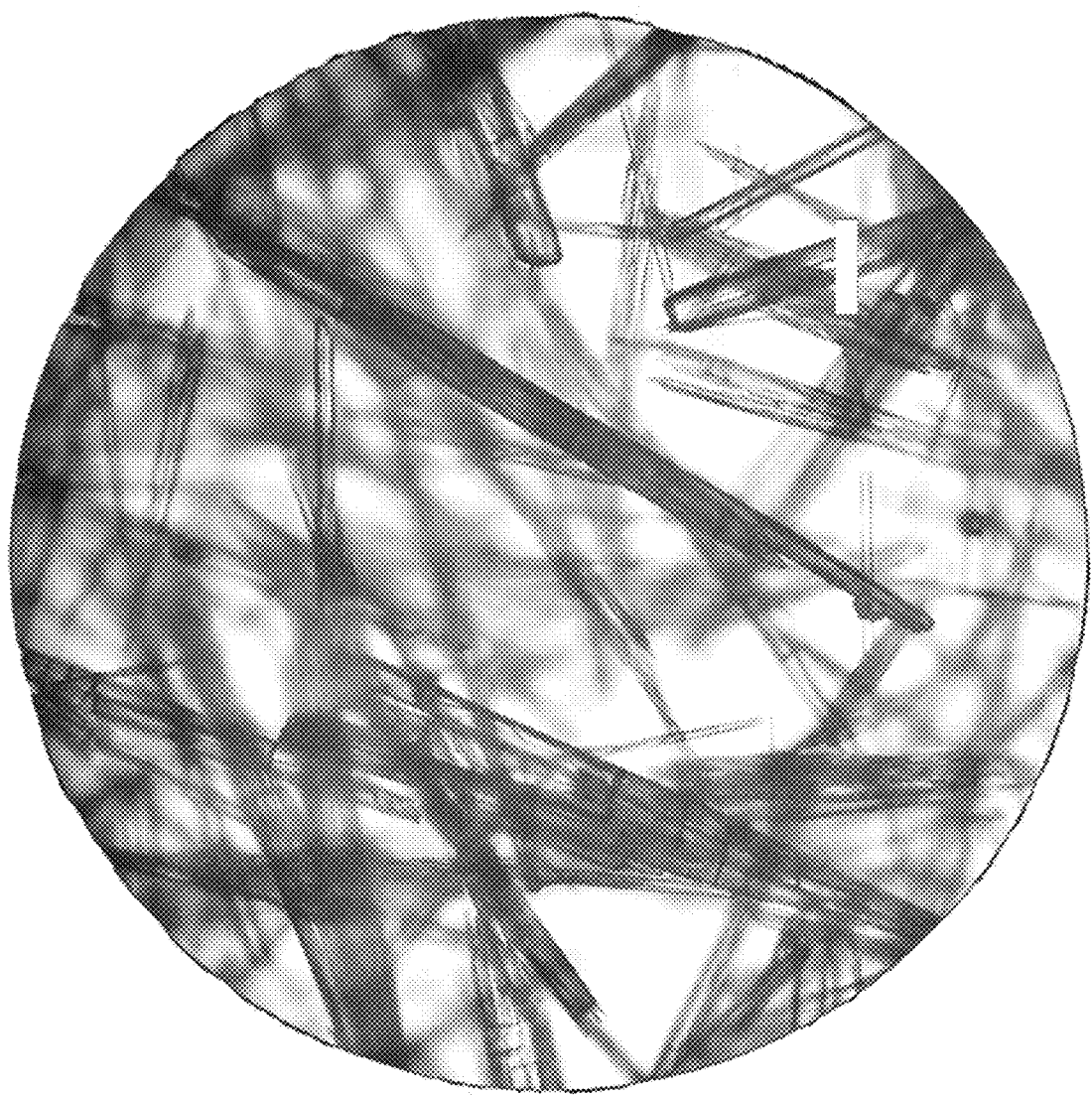
FIG. 18B illustrates an example image of $Zn_2$(dobpdc) crystallites, at ×50 magnification, synthesized in silanized glassware using the silanizing agent chlorotrimethylsilane, whose size is dependent on the surface functionality of the glassware, in accordance with an embodiment of a third reaction scheme in the present disclosure.

Further, use of different surface functionalities can determine crystallite size. For example, referring to FIG. 18, identical reaction conditions can go to two different crystallite size ranges depending on the surface functionality of the reaction vessel. Unsilanized glassware leads to the formation of $Zn_2(dobdc)$ with length 40-100 microns and width 5-20 microns (FIG. 18A), while silanized glassware leads to the formation of $Zn_2(dobdc)$ with length 300-1000 microns and width 20-80 microns (FIG. 18B).

V. Technical Applications

In one aspect of the present disclosure, there is provided a number of technical applications for the disclosed adsorption materials.

One such application is carbon capture from coal flue gas or natural gas flue gas. The increasing atmospheric levels of carbon dioxide ($CO_2$), which are contributing to global climate change, warrant new strategies for reducing $CO_2$ emissions from point sources such as power plants. In particular, coal-fueled power plants are responsible for 30-40% of global $CO_2$ emissions. See Quadrelli et al., 2007, "The energy-climate challenge: Recent trends in $CO_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, $NO_x$) at ambient pressure and 40° C. See Planas et al., 2013, "The Mechanism of Carbon Dioxide Adsorption in an Alkylamine-Functionalized Metal-organic Framework," J. Am. Chem. Soc. 135, pp. 7402-7405, which is hereby incorporated by reference. Similarly, growing use of natural gas as a fuel source necessitates the need for adsorbents capable of $CO_2$ capture from the flue gas of natural gas-fired power plants. Flue gas produced from the combustion of natural gas contains lower $CO_2$ concentrations of approximately 4-10% $CO_2$, with the remainder of the stream consisting of $H_2O$ (saturated), $O_2$ (4-12%), and $N_2$ (balance). In particular, for a temperature swing adsorption process an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another such application is carbon capture from crude biogas. Biogas, the $CO_2/CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from $CO_2/CH_4$ mixtures with a high working capacity and minimal regeneration energy has the potential to greatly reduce the cost of using biogas in place of natural gas for applications in the energy sector.

The disclosed compositions (adsorption materials) can be used to strip a major portion of the $CO_2$ from the $CO_2$-rich gas stream, and the adsorption material enriched for $CO_2$ can be stripped of $CO_2$ using a temperature swing adsorption method, a pressure swing adsorption method, a vacuum swing adsorption method, a concentration swing adsorption method, or a combination thereof. Example temperature swing adsorption methods and vacuum swing adsorption methods are disclosed in International Publication Number WO2013/059527 A1, which is hereby incorporated by reference.

In some embodiments, the disclosed compositions (adsorption materials) are used to separate hydrocarbon mixtures such as ethane/ethylene, propane/propylene, and $C_6$ alkane mixtures, among many others. Industrial production of these hydrocarbons produces mixtures of the olefin/paraffin types or other isomers, which do not match market demand and must be separated. Some of the current technologies are very energy-intensive processes such as distillation, and some are crystallization or adsorption-based. Implementing better adsorption-based materials has the potential to greatly reduce energy costs in industrial separations.

In some embodiments, the disclosed compositions are used as heterogeneous catalysts for the conversion of light alkanes into value-added chemicals, among other processes, including the conversion of methane. Given the recent worldwide increase in natural gas reserves, this process is one with tremendous economic and environmental impacts. Therefore, materials and routes for converting methane to higher hydrocarbons are highly desired.

CONCLUSION

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

We claim:

1. A method of synthesizing a crystalline metalorganic framework comprising a plurality of cations and a plurality of polytopic organic linkers, wherein each polytopic organic linker in the plurality of polytopic organic linkers is connected to two or more cations in the plurality of cations, the method comprising:
   reacting the plurality of polytopic organic linkers with one or more compounds of formula $M_nX_m$, wherein
   M is cationic Be, Mg, Ca, Ti, V, Cr, Mn, Fe, Co, Ni, Cu, Zn, Zr, Nb, Mo, Ru, Rh, Pd, Cd, Hf,
   X is a basic anion,
   n is a positive integer,
   m is a positive integer, and
   the reacting is in the presence
   of a buffer devoid of metal coordinating functionality thereby controlling an amount of crystal growth of the metal-organic framework along one or more crystallographic directions or a linear combination thereof.

2. The method of claim 1, wherein each polytopic organic linker in the plurality of polytopic organic linkers has the formula:

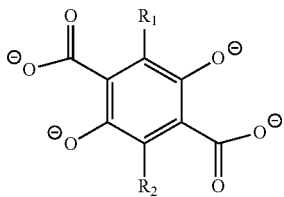

wherein, $R_1$ and $R_2$ are each independently selected from H, halogen, hydroxyl, methyl, or halogen substituted methyl.

3. The method of claim 2, wherein $R_1$ and $R_2$ are each hydrogen.

4. The method of claim 1, wherein each polytopic organic linker in the plurality of polytopic organic linkers has the formula:

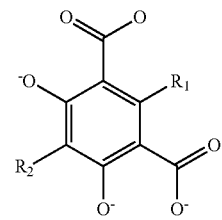

wherein, $R_1$ and $R_2$ are each independently selected from H, halogen, hydroxyl, methyl, or halogen substituted methyl.

5. The method of claim 4, wherein $R_1$ and $R_2$ are each hydrogen.

6. The method of claim 1, wherein each polytopic organic linker in the plurality of polytopic organic linkers has the formula:

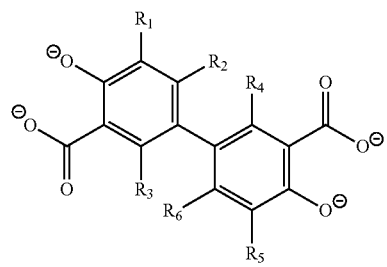

wherein $R_1$, $R_2$, $R_3$, $R_4$, $R_5$, and $R_6$ are each independently selected from H, halogen, hydroxyl, methyl, or halogen substituted methyl.

7. The method of claim 6, wherein $R_1$, $R_2$, $R_3$, $R_4$, $R_5$, and $R_6$ are each hydrogen.

8. The method of claim 1, wherein each polytopic organic linker in the plurality of polytopic organic linkers has the formula:

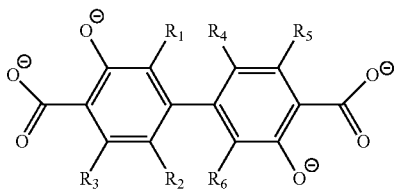

wherein $R_1$, $R_2$, $R_3$, $R_4$, $R_5$, and $R_6$ are each independently selected from H, halogen, hydroxyl, methyl, or halogen substituted methyl.

9. The method of claim 8, wherein $R_1$, $R_2$, $R_3$, $R_4$, $R_5$, and $R_6$ are each hydrogen.

10. The method of claim 1, wherein each polytopic organic linker in the plurality of polytopic organic linkers is:
   4,4'-dioxidobiphenyl-3,3'-dicarboxylate (dobpdc$^{4-}$),
   4,4''-dioxido-[1,1':4',1''-terphenyl]-3,3''-dicarboxylate (dotpdc$^{4-}$),
   dioxidobiphenyl-4,4'-dicarboxylate (para-carboxylate-dobpdc$^{4-}$, also referred to as pc-dobpdc$^{4-}$),
   2,5-dioxidobenzene-1,4-dicarboxylate (dobdc$^{4-}$),
   4,6-dioxido-1,3-benzenedicarboxylate (m-dobdc$^{4-}$''),
   1,3,5-benzenetristetrazolate (BTT),
   1,3,5-benzenetristriazolate (BTTri),
   1,3,5-benzenetrispyrazolate (BTP), or
   1,3,5-benzenetriscarboxylate (BTC).

11. The method of claim 1, wherein each polytopic organic linker in the plurality of polytopic organic linkers is 2,5-dioxido-1,4-benzenedicarboxylate (dobdc$^{4-}$'').

12. The method of claim 1, wherein a compound in the one or more compounds of formula $M_nX_m$ is a magnesium (II) metal salt, a manganese(II) metal salt, an iron(II) metal salt, a cobalt (II) metal salt, a nickle(II) metal salt, a zinc(II) metal salt, or a cadmium(II) metal salt.

13. The method of claim 1, wherein a compound in the one or more compounds of formula $M_nX_m$ is cobalt(II) nitrate, cobalt(II) chloride, cobalt(II) acetate, cobalt(II) sulfate, cobalt(II) iodide, cobalt(II) bromide, cobalt(II) trifluorosulfonate, cobalt(II) tetrafluoroborate, cobalt(II) acetylacetonate, cobalt(II) formate, or a halogenated derivative thereof.

14. The method of claim 1, wherein the pKa of the anion is above the lowest pKa value of the polytopic organic linker.

15. The method of claim 1, wherein the basic anion is formate or acetate.

16. The method of claim 1, wherein the basic anion is sulfate, bromide, iodide, or triflurosulfonate.

17. The method of claim 1, wherein the reacting is performed in unsilanized glassware using an oil bath.

18. The method of claim 1, wherein the reacting is performed in functionalized glassware thereby controlling phase or morphology of the crystalline metal-organic framework.

19. The method of claim 1, wherein the reacting is performed in the presence of a benign surface.

20. The method of claim 19, wherein the benign surface is plastic or steel.

21. The method of claim 1, wherein the reacting is performed in glassware that has been silanized with a silanizing agent.

22. The method of claim 21, wherein the silanizing agent comprises chlorotrimethylsilane, trichlorohexylsilane, N,O-bis(trimethylsilyl)acetamide, or a mixture thereof.

23. The method of claim 1, wherein the reacting occurs in a 1:1 ethanol:$H_2O$ solvent.

24. The method of claim 1, wherein the reacting occurs at a temperature greater than 25° C. for at least one hour.

25. The method of claim 1, wherein the reacting occurs at a temperature greater than 25° C. for at least eight hours.

26. The method of claim 1, wherein the buffer devoid of metal coordinating functionality is PIPES, PIPPS, PIPBS, DEPP, DESPEN, MES, TEEN, PIPES, MOBS, DESPEN, or TEMN.

27. The method of claim 1, wherein the buffer devoid of metal coordinating functionality is an alkyl or alkylsulfonate derivative of morpholine, piperazine, ethylenediamine, or methylenediamine.

28. The method of claim 1, wherein the amount of crystal growth of the metal-organic framework along one or more crystallographic directions or a linear combination thereof of the crystalline metal-organic framework is controlled by the reacting so that the crystalline metal-organic framework is in the form of crystals having an average length to width aspect ratio of less than 5.

29. The method of claim 1, wherein the amount of crystal growth of the metal-organic framework along one or more crystallographic directions or a linear combination thereof of the crystalline metal-organic framework is controlled so that the crystalline metal-organic framework is in the form of crystals having an average length to width aspect ratio of less than 2.

30. The method of claim 1, wherein the amount of crystal growth of the metal-organic framework along one or more crystallographic directions or a linear combination thereof of the crystalline metal-organic framework is controlled so that the crystalline metal-organic framework is in the form of crystals having an average length to width aspect ratio of less than 1.3.

31. The method of claim 1, wherein n is 1 and m either 1 or 2.

32. The method of claim 1, wherein m is 2 or greater.

33. The method of claim 1, wherein each polytopic organic linker in the plurality of polytopic organic linkers is connected to two metal cations in the plurality of metal cations.

34. The method of claim 1, wherein the crystalline metal-organic framework comprises crystals having a length between five hundred nanometers to one millimeter.

* * * * *